(12) United States Patent
Nakamura

(10) Patent No.: US 12,447,609 B2
(45) Date of Patent: Oct. 21, 2025

(54) MANUFACTURING SYSTEM

(71) Applicant: OMRON CORPORATION, Kyoto (JP)

(72) Inventor: Yoshiyuki Nakamura, Kyoto (JP)

(73) Assignee: OMRON CORPORATION, Kyoto (JP)

(*) Notice: Subject to any disclaimer, the term of this patent is extended or adjusted under 35 U.S.C. 154(b) by 53 days.

(21) Appl. No.: 18/145,628

(22) Filed: Dec. 22, 2022

(65) Prior Publication Data

US 2023/0219217 A1    Jul. 13, 2023

(30) Foreign Application Priority Data

Jan. 11, 2022  (JP) ................................. 2022-002155

(51) Int. Cl.
*B25J 9/16* (2006.01)
*B60P 3/22* (2006.01)

(52) U.S. Cl.
CPC ............... *B25J 9/162* (2013.01); *B60P 3/228* (2013.01)

(58) Field of Classification Search
CPC ............. B60P 3/228; G06N 5/046; H02J 3/32
USPC .......................................................... 141/94
See application file for complete search history.

(56) References Cited

U.S. PATENT DOCUMENTS

| | | | |
|---|---|---|---|
| 6,331,694 B1 | 12/2001 | Blankenship | |
| 2004/0163731 A1* | 8/2004 | Eichelberger | F17C 1/00 141/284 |
| 2005/0048334 A1* | 3/2005 | Sridhar | C25B 9/19 429/465 |
| 2008/0235970 A1* | 10/2008 | Crampton | G01B 11/03 901/14 |
| 2014/0263401 A1* | 9/2014 | McAlister | H01M 8/04425 222/23 |
| 2017/0362076 A1* | 12/2017 | Hall | H04W 4/44 |
| 2020/0002823 A1* | 1/2020 | Ono | C25B 9/73 |
| 2021/0339858 A1 | 11/2021 | Ermanoski | |
| 2022/0170597 A1* | 6/2022 | Saha | F17C 5/007 |
| 2022/0397238 A1* | 12/2022 | Okano | F17C 5/06 |

FOREIGN PATENT DOCUMENTS

| | | |
|---|---|---|
| CN | 113113646 A | 7/2021 |
| CN | 113551149 A | 10/2021 |
| JP | 2001-219271 A | 8/2001 |
| JP | 2021-61721 A | 4/2021 |
| JP | 2021-077329 A | 5/2021 |
| WO | 2017/022135 A1 | 2/2017 |

(Continued)

OTHER PUBLICATIONS

WO 2020087425 A1—English Translation (Year: 2020).*

(Continued)

*Primary Examiner* — Craig M Schneider
*Assistant Examiner* — Christopher M Afful
(74) *Attorney, Agent, or Firm* — Sughrue Mion, PLLC

(57) ABSTRACT

A manufacturing system includes: a first tank configured to store generation fuel; a manufacturing device having a first power generation device configured to generate power using the generation fuel, the manufacturing device being configured to operate using power supplied from the first power generation device; and a transport robot configured to transport the generation fuel from the first tank to the manufacturing device.

12 Claims, 12 Drawing Sheets

(56) References Cited

FOREIGN PATENT DOCUMENTS

| WO | 2019/019402 | A1 |   | 1/2019 |
|----|-------------|----|---|--------|
| WO | WO-2020087425 | A1 | * | 5/2020 |
| WO | 2021/054521 | A1 |   | 3/2021 |

OTHER PUBLICATIONS

Extended European Search Report dated Jun. 12, 2023 in Application No. 22215202.7.
Communication issued Mar. 31, 2025 in Chinese Application No. 202211588667.9.
Communication issued Jun. 10, 2025 in Japanese Application No. 2022-002155.

* cited by examiner

MANUFACTURING SYSTEM

BACKGROUND OF THE INVENTION

Field of the Invention

The present disclosure relates to a manufacturing system.

Description of the Background Art

It is often necessary to change the layout of a production line in a factory according to the change in the types or the specifications of product. Japanese Patent Laying-Open No. 2021-77329 discloses a production process management system capable of handling the change in the layout of a production line.

SUMMARY OF THE INVENTION

When the layout of a production line is changed, a manufacturing device constituting the production line is moved, and thus, a work of changing electric wiring for supplying power to the manufacturing device is required in many cases. Therefore, it takes time and effort to change the layout of the production line. Japanese Patent Laying-Open No. 2021-77329 does not consider a work of changing electric wiring accompanying a change in the layout of a production line.

The present disclosure has been made in view of the above problems, and an object of the present disclosure is to provide a manufacturing system capable of easily changing a layout of a production line.

According to an example of the present disclosure, a manufacturing system includes: a first tank configured to store generation fuel; a manufacturing device having a first power generation device configured to generate power using the generation fuel, the manufacturing device being configured to operate using power supplied from the first power generation device; and a transport robot configured to transport the generation fuel from the first tank to the manufacturing device.

According to the present disclosure, the manufacturing device is equipped with the first power generation device configured to generate power using the generation fuel transported by the transport robot, and is operated by power from the first power generation device. Therefore, even if the manufacturing device is moved accompanying a change in the layout of the production line, a work of changing electric wiring for the manufacturing device is not required. As a result, the layout of the production line can be easily changed.

In the above disclosure, the manufacturing device includes: a second tank configured to store the generation fuel; and a communication unit configured to transmit a first request to the transport robot in response to a remaining amount of the second tank being smaller than a threshold value. The transport robot includes: a mobile robot; a third tank configured to store the generation fuel; and a controller configured to control the mobile robot. The controller: controls the mobile robot to move to the first tank in response to reception of the first request; and controls the mobile robot to move to the manufacturing device in response to completion of transportation of the generation fuel from the first tank to the third tank.

According to the above disclosure, the transport robot transports the generation fuel to the manufacturing device at timing when the remaining amount of the second tank included in the manufacturing device becomes smaller than the threshold value. As a result, it is possible to carry out transportation by the transport robot efficiently.

In the above disclosure, the transport robot includes: a second power generation device configured to generate power using the generation fuel stored in the third tank. The mobile robot operates using power supplied from the second power generation device.

According to the above disclosure, it is not necessary to consider securing a power supply for the mobile robot.

In the above disclosure, the manufacturing system further includes a first prediction unit configured to predict a demand amount based on a planned quantity of products to be manufactured by the manufacturing device and a product type of the products. According to the above disclosure, it is possible to predict the demand amount more accurately.

In the above disclosure, the manufacturing system further includes: a fuel production system configured to produce the generation fuel. The first tank includes: a main tank configured to store the generation fuel produced by the fuel production system; and a reserve tank configured to store generation fuel supplied from outside of the fuel production system. The fuel production system determines one of the main tank and the reserve tank as a target tank depending on an environment in which the generation fuel is produced, and supplies the generation fuel from the target tank to the transport robot.

According to the above disclosure, it is possible to avoid a situation in which the generation fuel to be supplied to the transport robot is insufficient.

In the above disclosure, the fuel production system includes: a second prediction unit configured to predict a production amount of the generation fuel to be produced in a certain future period based on the environment; and a determination unit configured to determine the target tank based on the production amount, and a storage amount of the generation fuel in the main tank.

According to the above disclosure, it is possible to avoid a situation in which the generation fuel is supplied from the main tank to the transport robot even though the generation fuel in the main tank is insufficient.

In the above disclosure, the manufacturing system further includes: a fuel production system configured to produce the generation fuel. The first tank includes: a main tank configured to store the generation fuel produced by the fuel production system; and a reserve tank configured to store generation fuel supplied from outside of the fuel production system. The fuel production system includes: a second prediction unit configured to predict a production amount of the generation fuel to be produced in a certain future period based on an environment in which the generation fuel is produced; and a determination unit configured to determine one of the main tank and the reserve tank as a target tank based on the demand amount, the production amount, and a storage amount of the generation fuel in the main tank. The target tank supplies the generation fuel to the transport robot.

According to the above disclosure, it is also possible to avoid a situation in which the generation fuel is supplied from the main tank to the transport robot even though the generation fuel in the main tank is insufficient.

In the above disclosure, the fuel production system produces, as the generation fuel, formic acid by artificial photosynthesis. According to the above disclosure, it is possible to utilize renewable energy effectively.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
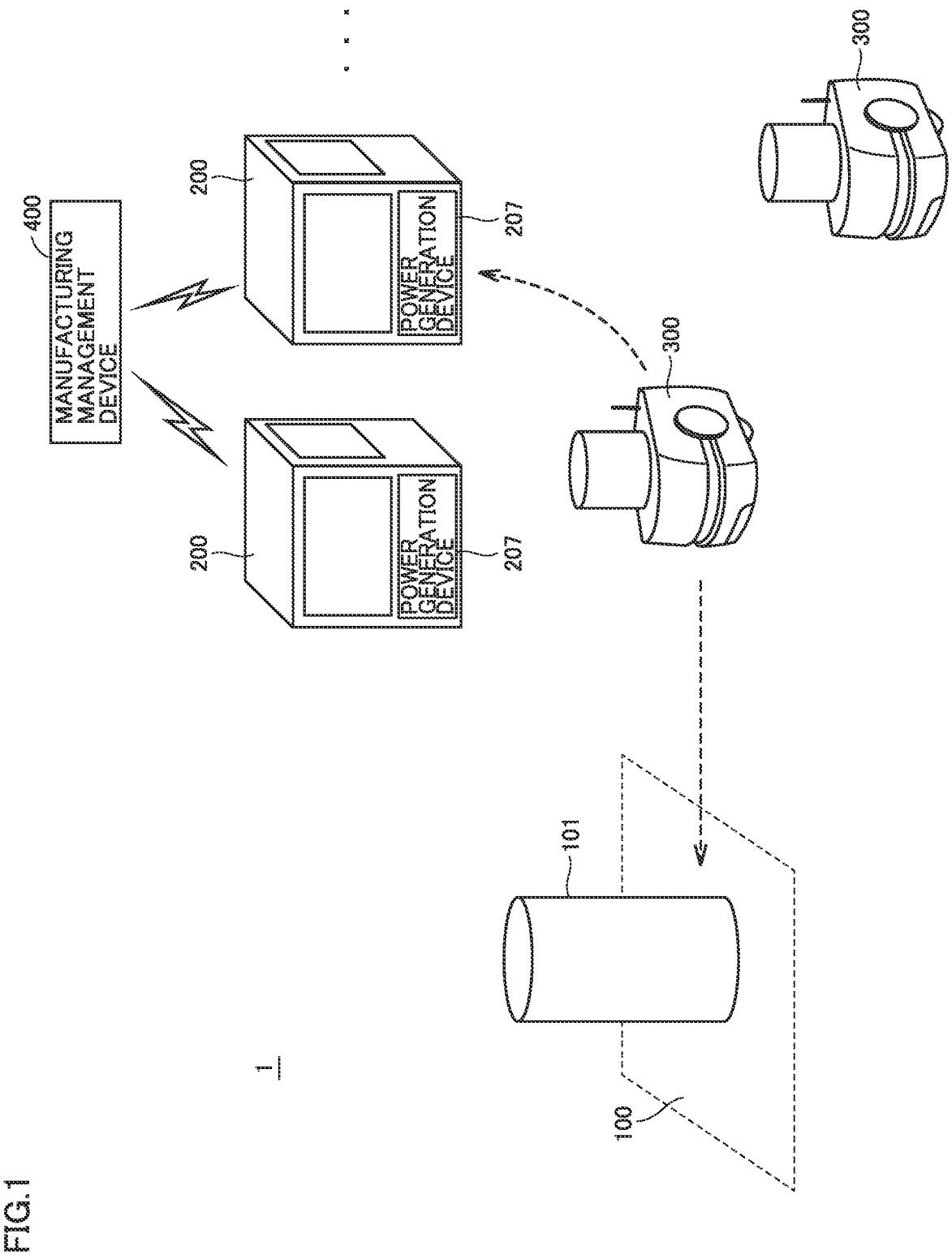
FIG. 1 is a schematic diagram illustrating an overall configuration of a manufacturing system according to an embodiment.

An embodiment of the present invention will be described in detail with reference to the drawings. The same or corresponding parts in the drawings are denoted by the same reference numerals, and the descriptions thereof will not be repeated.

§ 1 Application Example

With reference to FIG. 1, an example of a scene to which the present invention is applied will be described. FIG. 1 is a schematic diagram illustrating an overall configuration of a manufacturing system according to an embodiment. A manufacturing system 1 illustrated in FIG. 1 includes a fuel production system 100, one or more manufacturing devices 200, one or more transport robots 300, and a manufacturing management device 400.

Fuel production system 100 produces generation fuel. Fuel production system 100 includes a main tank 101 that stores produced generation fuel. Examples of the generation fuel include hydrogen, formic acid (HCOOH), alcohol, and the like.

One or more manufacturing devices 200 constitute a production line and manufacture target products. Each of one or more manufacturing devices 200 is equipped with a power generation device 207 that generates power using the generation fuel, and operates using the power supplied from power generation device 207.

Manufacturing management device 400 manages production information of each of one or more manufacturing devices 200. The production information indicates a product name of a product to be manufactured, a lot number, a planned number of products, a manufacturing condition, and the like. Each of one or more manufacturing devices 200 communicates (for example, wirelessly) with manufacturing management device 400, and performs an operation according to the production information managed by manufacturing management device 400.

Each of one or more transport robots 300 transports the generation fuel to one or more manufacturing devices 200 from main tank 101.

According to manufacturing system 1 of the present embodiment, each of one or more manufacturing devices 200 is equipped with power generation device 207 that generates power using the generation fuel transported by transport robot 300, and is operated by the power from power generation device 207. Therefore, even if manufacturing device 200 is moved accompanying a change in the layout of the production line, a work of changing electric wiring for manufacturing device 200 is not required. As a result, the layout of the production line can be easily changed.

§ 2 Specific Examples

<Configuration of Fuel Production System>

Figure 2:
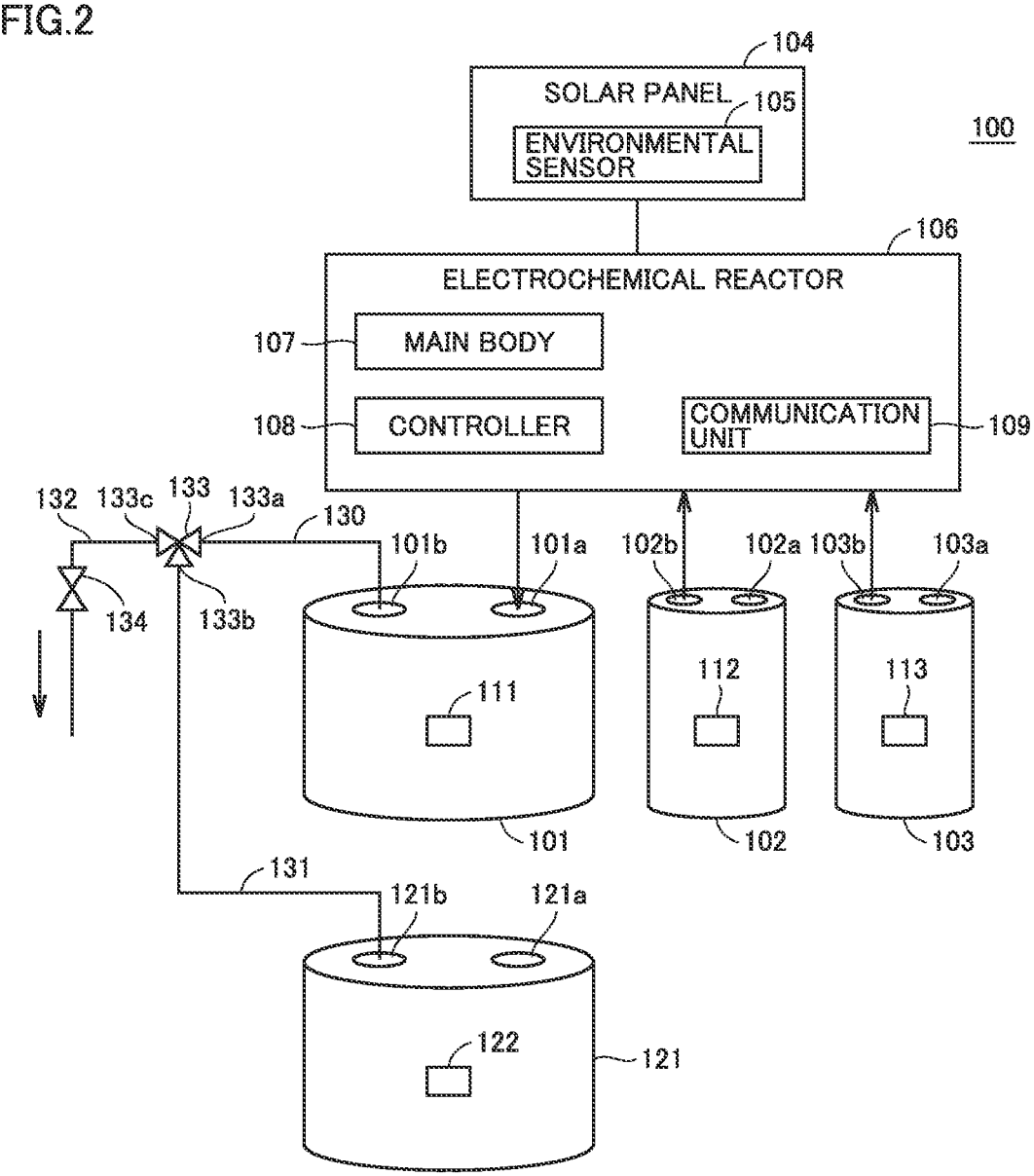
FIG. 2 is a schematic diagram illustrating an example of a configuration of a fuel production system illustrated in FIG. 1.

FIG. 2 is a schematic diagram illustrating an example of a configuration of a fuel production system illustrated in FIG. 1. FIG. 2 shows fuel production system 100 that produces formic acid as the generation fuel. Fuel production system 100 is also commonly referred to as an artificial photosynthesis system. As shown in FIG. 2, fuel production system 100 includes main tank 101, a water tank 102, a $CO_2$ tank 103, a reserve tank 121, a solar panel 104, an electrochemical reactor 106, pipes 130-132, a three-way valve 133, and a solenoid valve 134.

Main tank 101 stores formic acid generated by artificial photosynthesis. An inlet 101a and an outlet 101b are provided for main tank 101, and formic acid is input from inlet 101a and discharged from outlet 101b. A level sensor 111 is attached to main tank 101. Level sensor 111 measures an amount of formic acid stored in main tank 101, and outputs the measurement result to electrochemical reactor 106.

Water tank 102 stores water necessary for artificial photosynthesis. An inlet 102a and an outlet 102b are provided for water tank 102, and water is input from inlet 102a and discharged from outlet 102b. A level sensor 112 is attached to water tank 102. Level sensor 112 measures an amount of water stored in water tank 102, and outputs the measurement result to electrochemical reactor 106.

$CO_2$ tank 103 stores carbon dioxide ($CO_2$) necessary for artificial photosynthesis. $CO_2$ tank 103 has an internal space maintained under temperature and pressure conditions of a triple point or more of carbon dioxide, and stores liquid carbon dioxide. An inlet 103a and an outlet 103b are provided for $CO_2$ tank 103, and carbon dioxide is input from inlet 103a and discharged from outlet 103b. When gaseous carbon dioxide is charged from inlet 103a, the charged carbon dioxide is condensed into a liquid state and stored in $CO_2$ tank 103. A level sensor 113 is attached to $CO_2$ tank 103. Level sensor 113 measures an amount of carbon dioxide stored in $CO_2$ tank 103 and outputs the measurement result to electrochemical reactor 106.

Reserve tank 121 stores formic acid carried in from outside of fuel production system 100. An inlet 121*a* and an outlet 121*b* are provided for reserve tank 121, and formic acid is input from inlet 121*a* and discharged from outlet 121*b*. A level sensor 122 is attached to reserve tank 121. Level sensor 122 measures an amount of formic acid stored in reserve tank 121, and outputs the measurement result to electrochemical reactor 106.

Pipe 130 connects outlet 101*b* of main tank 101 and a port 133*a* of three-way valve 133. Pipe 131 connects outlet 121*b* of reserve tank 121 and a port 133*b* of three-way valve 133. Pipes 130 and 131 are each provided with a pump (not shown).

One end of pipe 132 is connected to a port 133*c* of three-way valve 133. Pipe 132 is provided with solenoid valve 134. At least a portion including the other end (lower end) of pipe 132 extends along the vertical direction.

Three-way valve 133 is switchable between a first state and a second state. The first state is a state in which port 133*a* and port 133*c* communicate with each other and port 133*b* does not communicate with ports 133*a* and 133*c*. The second state is a state in which port 133*b* and port 133*c* communicate with each other and port 133*a* does not communicate with ports 133*b* and 133*c*.

Solar panel 104 generates power using solar light. Solar panel 104 generally includes a plurality of photovoltaic elements and a condenser lens for condensing solar light on the photovoltaic elements. The photovoltaic elements are, for example, a group III-V semiconductor which is a semiconductor of a direct transition type. As the group III-V semiconductor, GaInP/GaAs/Ge, GaInP/GaAs/GaNAs, GaInP/GaAs, AlGaInP/GaAs/Ge, AlGaInP/GaAs/GaNAs, or AlGaInP/GaAs can be adopted. When receiving solar light, the photovoltaic elements generate electrons and holes by a photoelectric effect.

An environmental sensor 105 is attached to solar panel 104. Environmental sensor 105 measures an environment around solar panel 104 (for example, temperature, humidity and illuminance), and outputs the measurement result to electrochemical reactor 106.

Electrochemical reactor 106 includes a main body 107, a controller 108, and a communication unit 109.

Main body 107 produces formic acid by a known electrochemical reaction using electrons and holes generated by solar panel 104, water supplied from water tank 102, and carbon dioxide supplied from $CO_2$ tank 103.

Specifically, main body 107 includes an anode electrode and a cathode electrode disposed apart from each other, and a flow path defined between the anode electrode and the cathode electrode. The anode electrode and the cathode electrode are connected to solar panel 104. Electrons generated by solar panel 104 move to the cathode electrode. Holes generated by solar panel 104 move to the anode electrode.

Main body 107 causes an electrolytic solution containing water supplied from water tank 102 and carbon dioxide supplied from $CO_2$ tank 103 to flow through the flow path. As a result, water ($H_2O$) is oxidized on a surface of the anode electrode, and oxygen ($\frac{1}{2} O_2$) is obtained. In the cathode electrode, carbon dioxide ($CO_2$) is reduced to produce formic acid (HCOOH). The generated formic acid is charged into main tank 101.

Communication unit 109 mediates data transmission to and from external devices (including manufacturing device 200 and transport robot 300). Communication unit 109 performs data transmission using, for example, a wireless local area network (LAN).

Controller 108 controls an operation of main body 107, monitors the state of each unit of fuel production system 100, and performs control according to the monitoring result. Furthermore, controller 108 controls communication with the external devices (manufacturing device 200, transport robot 300, and the like).

Controller 108 is typically a computer having a general-purpose architecture, and executes processing according to the present embodiment by executing a program (instruction codes) installed in advance. Typically, such a program is distributed in a state of being stored in various recording media and the like, or is installed in controller 108 via a network or the like.

When such a general-purpose computer is used, an operating system (OS) for executing basic processing of the computer may be installed in addition to an application for executing the processing according to the present embodiment. In this case, the program according to the present embodiment may call a necessary module, among program modules provided as a part of the OS, in a predetermined array at a predetermined timing to execute processing. That is, the program itself according to the present embodiment does not need to include a module as described above, and the processing may be executed in cooperation with the OS. The program according to the present embodiment may be in a form not including a part of such modules.

Furthermore, the program according to the present embodiment may be provided by being incorporated in a part of another program. Also in this case, the program itself does not include the module included in the other program combined as described above, and the processing is executed in cooperation with the another program. That is, the program according to the present embodiment may be incorporated in such another program. Note that a part or all of the functions provided by execution of the program may be implemented as a dedicated hardware circuit such as an ASIC.

Figure 3:
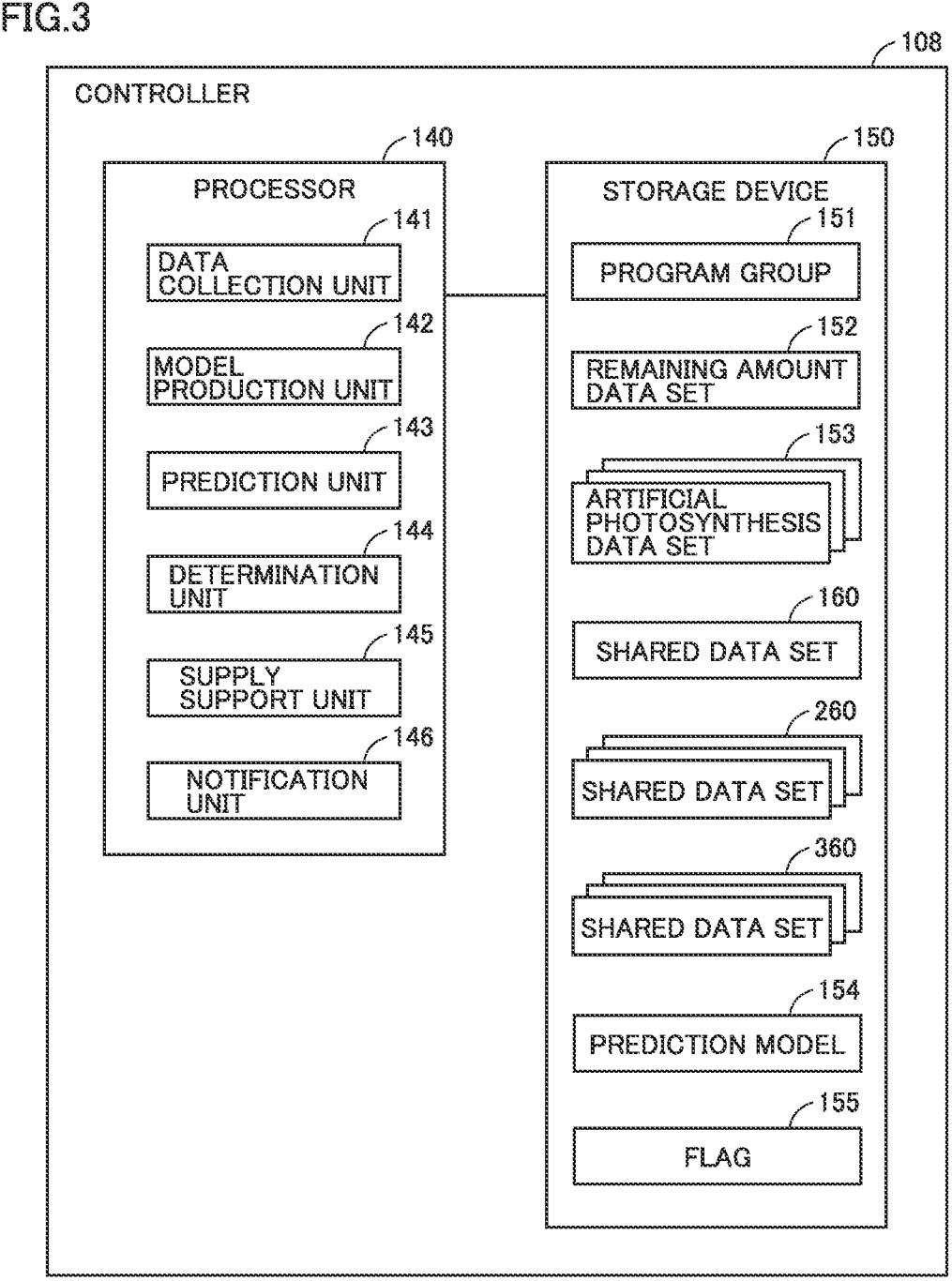
FIG. 3 is a diagram illustrating a configuration of a controller illustrated in FIG. 2.

FIG. 3 is a diagram illustrating a configuration of a controller illustrated in FIG. 2. As illustrated in FIG. 3, controller 108 includes a processor 140 such as a central processing unit (CPU) or a micro processing unit (MPU), and a storage device 150.

Storage device 150 includes, for example, a hard disk, a random access memory (RAM), a read only memory (ROM), a semiconductor storage device such as a flash memory, or the like, and stores a program group 151 and various data related to execution of program group 151.

Processor 140 executes program group 151 stored in storage device 150. Functional blocks realized by processor 140 executing program group 151 include a data collection unit 141, a model production unit 142, a prediction unit 143, a determination unit 144, a supply support unit 145, and a notification unit 146.

Data collection unit 141 periodically collects the measurement results of level sensors 111, 112, 113, and 122, and produces a remaining amount data set 152 indicating the latest measurement result. Data collection unit 141 stores produced remaining amount data set 152 in storage device 150.

Data collection unit 141 periodically collects the measurement result of environmental sensor 105. Furthermore, data collection unit 141 periodically collects a production amount of formic acid generated per unit time from main body 107. Data collection unit 141 produces a data set indicating the measurement results of level sensors 111, 112, 113, and 122, the measurement result of environmental sensor 105, and the production amount of formic acid per unit time that have been collected at the same timing (hereinafter referred to as an "artificial photosynthesis data set 153"), and stores produced artificial photosynthesis data set 153 in storage device 150.

Furthermore, data collection unit 141 produces a data set to be shared with manufacturing device 200 and transport robot 300 (hereinafter, referred to as a "shared data set 160"), and stores produced shared data set 160 in storage device 150. Data collection unit 141 periodically updates shared data set 160. Data collection unit 141 transmits updated shared data set 160 to manufacturing device 200 and transport robot 300 via communication unit 109 at timing when shared data set 160 is updated. Shared data set 160 includes, for example, data indicating the latest measurement results of level sensors 111, 112, 113, and 122 and environmental sensor 105.

Data collection unit 141 receives a shared data set 260 from each manufacturing device 200 via communication unit 109, and stores received shared data set 260 in storage device 150. Shared data set 260 includes data indicating a demand amount of formic acid in a future certain period. Similarly, data collection unit 141 receives a shared data set 360 from each transport robot 300 via communication unit 109, and stores received shared data set 360 in storage device 150.

Model production unit 142 performs multivariable regression analysis using artificial photosynthesis data set 153 to produce a prediction model 154 for predicting, from environmental parameters (temperature, humidity, and illuminance) measured by environmental sensor 105, a production amount of formic acid per unit time. Model production unit 142 stores produced prediction model 154 in storage device 150. As the multivariable regression analysis, a known method can be adopted.

Prediction unit 143 predicts a production amount of formic acid in a future certain period by inputting the latest measurement result of environmental sensor 105 to prediction model 154.

Determination unit 144 determines one of main tank 101 and reserve tank 121 as a target tank for supplying formic acid to transport robot 300, based on the amount of formic acid stored in main tank 101 and the demand amount and the production amount of formic acid in the certain future period. The amount of formic acid stored in main tank 101 is indicated by remaining amount data set 152. The demand amount of formic acid in the certain future period is indicated by shared data set 260. The production amount of formic acid generated in the certain future period is predicted by prediction unit 143.

Determination unit 144 calculates an amount obtained by subtracting the demand amount of formic acid in the certain future period from a sum of the production amount of formic acid in the certain future period and the amount of formic acid stored in main tank 101 (hereinafter, the amount obtained by the subtraction is referred to as a "difference"). When the difference exceeds a predetermined first threshold value, determination unit 144 determines main tank 101 as the target tank, and switches three-way valve 133 to the first state. As a result, formic acid is supplied from main tank 101 to transport robot 300 via pipes 130 and 132. When the difference is equal to or less than the first threshold value, determination unit 144 determines reserve tank 121 as the target tank, and switches three-way valve 133 to the second state. As a result, formic acid is supplied from reserve tank 121 to transport robot 300 via pipes 131 and 132.

Supply support unit 145 supports supply of formic acid to transport robot 300. Supply support unit 145 receives a supply request from transport robot 300 via communication unit 109. A robot ID for identifying transport robot 300 and data indicating a required amount of formic acid are added to the supply request.

Upon receiving the supply request, supply support unit 145 checks a flag 155 stored in storage device 150. Flag 155 is set to either "1" indicating that supply is permitted or "0" indicating that supply is not permitted. When flag 155 is "0", supply support unit 145 transmits a standby signal to transport robot 300 which is a transmission source of the supply request (that is, transport robot 300 identified by the robot ID appended to the supply request) via communication unit 109. When flag 155 is "1", supply support unit 145 transmits a permission signal to transport robot 300 which is the transmission source of the supply request via communication unit 109, and changes flag 155 to "0".

Upon reception of a supply start instruction from transport robot 300 via communication unit 109, supply support unit 145 opens solenoid valve 134 and drives a pump provided in a pipe 130, 131. When three-way valve 133 is in the first state, supply support unit 145 drives the pump provided in pipe 130. When three-way valve 133 is in the second state, supply support unit 145 drives the pump provided in pipe 131. When the formic acid is supplied by the required amount indicated by the data added to the supply request, supply support unit 145 closes solenoid valve 134 and stops the pump. The supply amount is measured by a flow meter (not illustrated). Further, supply support unit 145 outputs a signal indicating completion of the supply to transport robot 300, and changes flag 155 to "1".

Notification unit 146 performs notification according to the amount indicated by remaining amount data set 152. For example, notification unit 146 may perform notification using an indicator (not illustrated), or may transmit a notification message to a terminal via communication unit 109.

In response to a remaining amount of water tank 102 being equal to or less than a predetermined lower limit value, notification unit 146 makes notification for requesting supply of water. In response to a remaining amount of $CO_2$ tank 103 being equal to or less than a predetermined lower limit value, notification unit 146 makes notification for requesting supply of carbon dioxide. In response to a remaining amount in reserve tank 121 being equal to or less than a predetermined lower limit value, notification unit 146 makes notification for requesting supply of formic acid to reserve tank 121.

<Configuration of Manufacturing Device>

Figure 4:
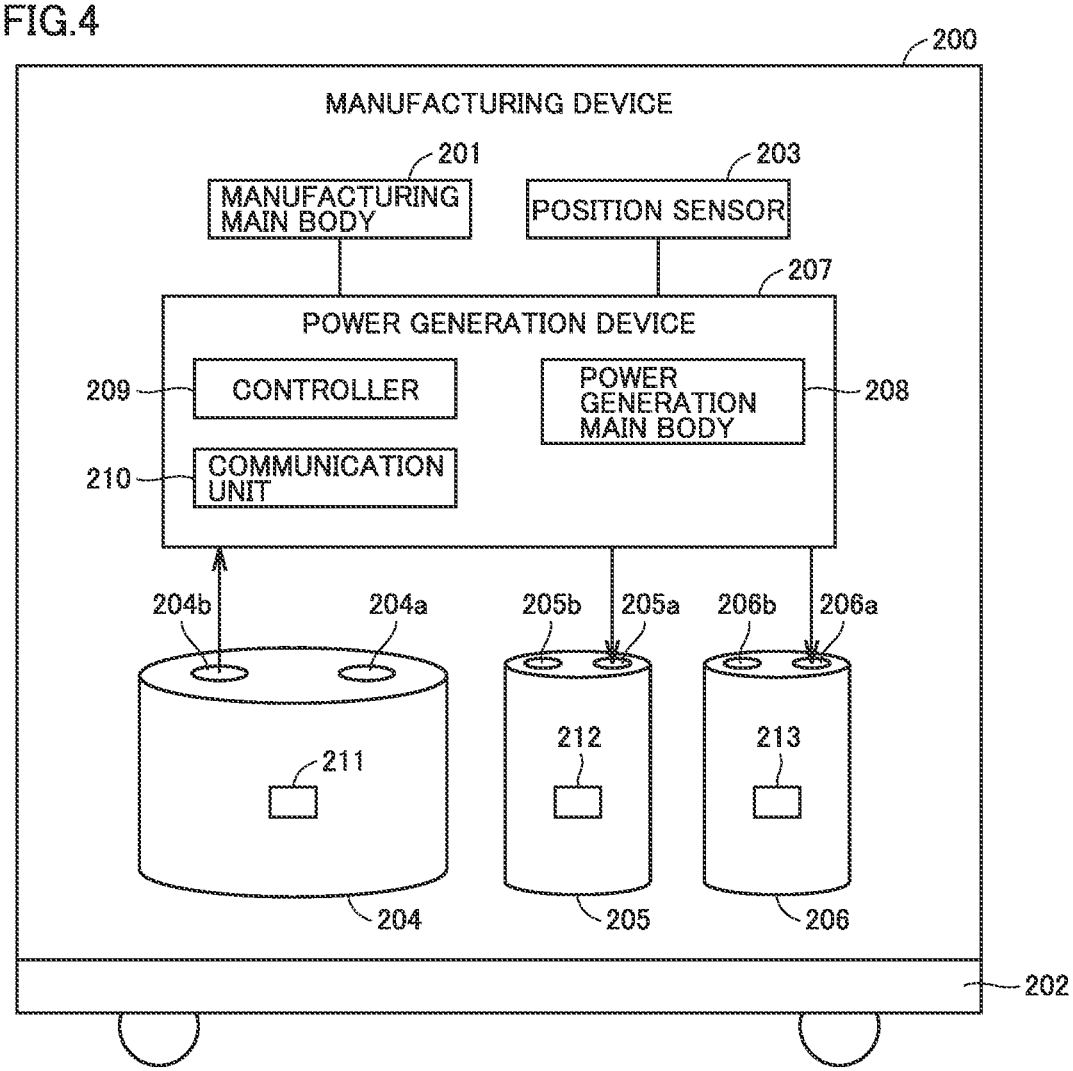
FIG. 4 is a schematic diagram illustrating an example of a configuration of a manufacturing device illustrated in FIG. 1.

FIG. 4 is a schematic diagram illustrating an example of a configuration of a manufacturing device illustrated in FIG. 1. As illustrated in FIG. 4, manufacturing device 200 includes a manufacturing main body 201, a wagon 202, a position sensor 203, a formic acid tank 204, a water tank 205, a $CO_2$ tank 206, and power generation device 207.

Manufacturing main body 201 includes manufacturing equipment (including robots, processing machines, inspection machines, and the like) for manufacturing a product, a controller for controlling operation of the equipment, a communication unit for communicating with manufacturing management device 400, and the like. The controller controls the operation of the manufacturing equipment according to an instruction from manufacturing management device 400 or an operation by the worker. Manufacturing main body 201 operates using the power generated by power generation device 207.

Wagon 202 is used when manufacturing device 200 is moved. Wagon 202 moves by receiving external force. The external force includes human force and force of a drive motor (not illustrated). Since manufacturing device 200 is provided with wagon 202, manufacturing device 200 can be easily moved.

Position sensor 203 measures a position of manufacturing device 200 (more specifically, a position of formic acid tank 204). Position sensor 203 measures the position of manufacturing device 200 using a known technique. For example, a global positioning system (GPS), a beacon positioning method of measuring a position by strength determination of a Bluetooth (registered trademark) low energy (BLE) signal, or the like can be applied. Position sensor 203 outputs position data indicating the measured position to power generation device 207.

Formic acid tank 204 stores formic acid used for power generation by power generation device 207. An inlet 204a and an outlet 204b are provided for formic acid tank 204, and formic acid is input from inlet 204a and discharged from outlet 204b. A level sensor 211 is attached to formic acid tank 204. Level sensor 211 measures an amount of formic acid stored in formic acid tank 204, and outputs the measurement result to power generation device 207.

Water tank 205 stores water generated by power generation by power generation device 207. An inlet 205a and an outlet 205b are provided for water tank 205, and water is input from inlet 205a and discharged from outlet 205b. A level sensor 212 is attached to water tank 205. Level sensor 212 measures an amount of water stored in water tank 205, and outputs the measurement result to power generation device 207.

$CO_2$ tank 206 stores carbon dioxide ($CO_2$) generated by power generation by power generation device 207. $CO_2$ tank 206 stores gaseous carbon dioxide. An inlet 206a and an outlet 206b are provided for $CO_2$ tank 206, and carbon dioxide is input from inlet 206a and discharged from outlet 206b. A level sensor 213 is attached to $CO_2$ tank 206. Level sensor 213 measures an amount of carbon dioxide stored in $CO_2$ tank 206 and outputs the measurement result to power generation device 207.

Power generation device 207 includes a power generation main body 208, a controller 209, and a communication unit 210.

Power generation main body 208 generates power using formic acid supplied from formic acid tank 204 as the generation fuel using a known technique. As a power generation method using formic acid, a fuel cell method in which formic acid is reformed into hydrogen and then the hydrogen is used, and a direct fuel cell method in which power is generated by a reaction between formic acid and oxygen are known.

Power generation using formic acid produces water and carbon dioxide. Power generation main body 208 discharges water and carbon dioxide that have been produced to water tank 205 and $CO_2$ tank 206, respectively.

Communication unit 210 mediates data transmission to and from external devices (including electrochemical reactor 106 and transport robot 300). Communication unit 210 performs data transmission using, for example, a wireless local area network (LAN).

Controller 209 controls an operation of power generation main body 208, monitors the state of each unit of manufacturing device 200, and performs control according to the monitoring result. Furthermore, controller 209 controls communication with the external devices (electrochemical reactor 106, transport robot 300, and the like).

Controller 209 is typically a computer having a general-purpose architecture, and executes processing according to the present embodiment by executing a program (instruction codes) installed in advance. Typically, such a program is distributed in a state of being stored in various recording media and the like, or is installed in controller 209 via a network or the like.

When such a general-purpose computer is used, an OS for executing basic processing of the computer may be installed in addition to an application for executing the processing according to the present embodiment. In this case, the program according to the present embodiment may call a necessary module, among program modules provided as a part of the OS, in a predetermined array at a predetermined timing to execute processing. That is, the program itself according to the present embodiment does not need to include a module as described above, and the processing may be executed in cooperation with the OS. The program according to the present embodiment may be in a form not including a part of such modules.

Furthermore, the program according to the present embodiment may be provided by being incorporated in a part of another program. Also in this case, the program itself does not include the module included in the other program combined as described above, and the processing is executed in cooperation with the another program. That is, the program according to the present embodiment may be incorporated in such another program. Note that a part or all of the functions provided by execution of the program may be implemented as a dedicated hardware circuit such as an ASIC.

Figure 5:
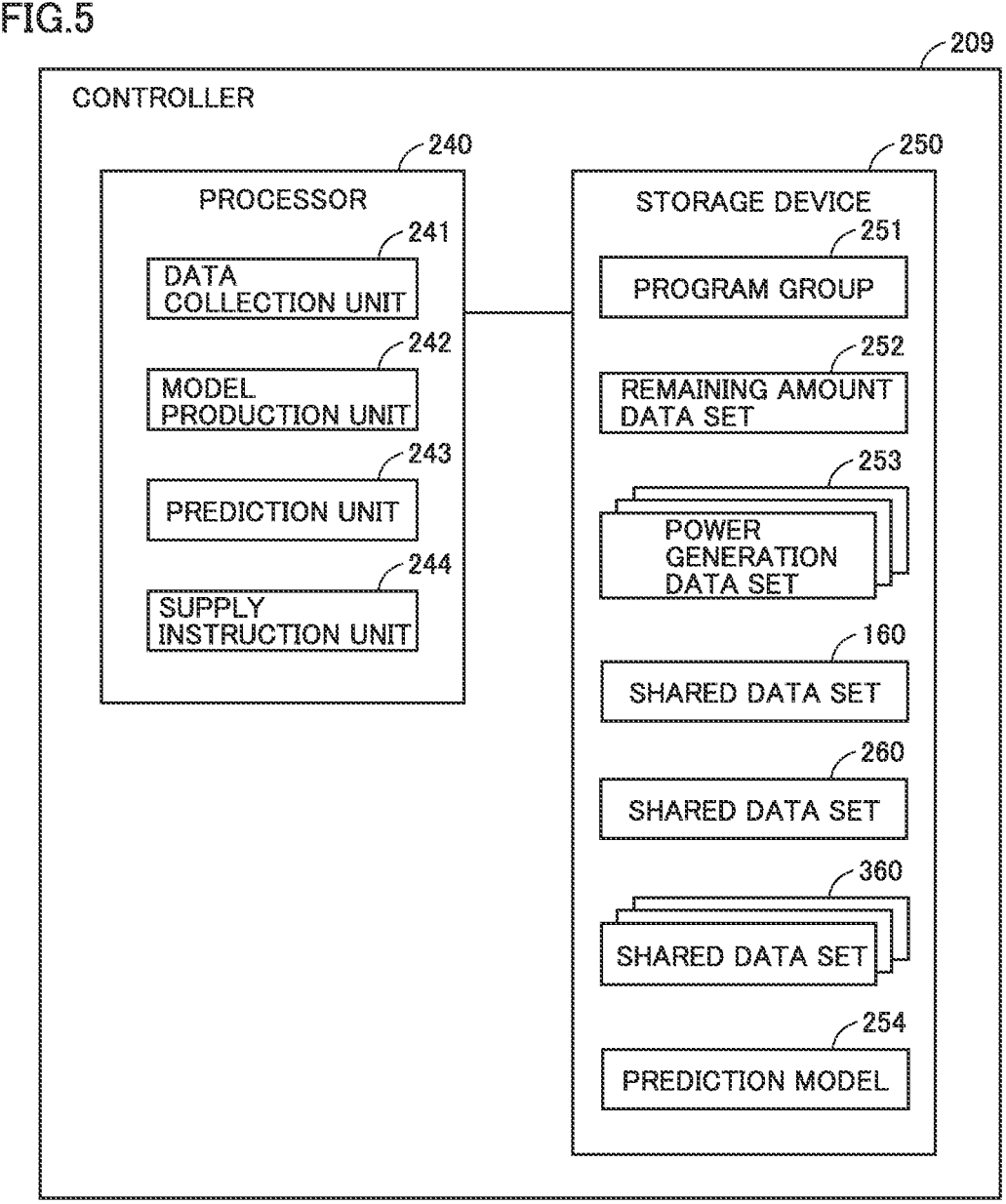
FIG. 5 is a diagram illustrating a configuration of a controller illustrated in FIG. 4.

FIG. 5 is a diagram illustrating a configuration of a controller illustrated in FIG. 4. Controller 209 controls an operation of each unit of transport robot 300. As illustrated in FIG. 5, controller 209 includes a processor 240 such as a CPU or an MPU and a storage device 250.

Storage device 250 includes, for example, a hard disk, a RAM, a ROM, a semiconductor storage device, or the like, and stores a program group 251 and various data related to execution of program group 251.

Processor 240 executes program group 251 stored in storage device 250. Functional blocks realized by processor 240 executing program group 251 include a data collection unit 241, a model production unit 242, a prediction unit 243, and a supply instruction unit 244.

Data collection unit 241 periodically collects the measurement results of level sensors 211, 212, and 213, and produces a remaining amount data set 252 indicating the latest measurement result. Data collection unit 241 stores produced remaining amount data set 252 in storage device 250.

Data collection unit 241 produces a power generation data set 253 for each lot. Power generation data set 253 includes data indicating each of a quantity of products, a product name of the products, a manufacturing period of the lot, and a consumption amount of formic acid for manufacturing the lot. Data indicating each of the quantity and the product name of the products is acquired from manufacturing management device 400. The manufacturing period of the lot is a period from the time when the target lot is input to manufacturing main body 201 to the time when processing on the target lot is completed, and is acquired from manufacturing main body 201. The consumption amount of formic acid for manufacturing the lot is calculated from a difference between the measurement result of level sensor 211 at the time when the target lot is input and the measurement result of level sensor 211 at the time when the processing on the target lot is completed. Data collection unit 241 stores power generation data set 253 produced for each lot in storage device 250.

Furthermore, data collection unit 241 produces shared data set 260 to be shared with electrochemical reactor 106 and transport robot 300, and stores produced shared data set 260 in storage device 250. Data collection unit 241 periodically updates shared data set 260. Data collection unit 241 transmits updated shared data set 260 to electrochemical reactor 106 and transport robot 300 via communication unit 210 at timing when shared data set 260 is updated. Shared data set 260 includes, for example, data indicating the latest measurement results of level sensors 211, 212, and 213 and data indicating the demand amount of formic acid predicted by prediction unit 243.

Data collection unit 241 receives shared data set 160 from electrochemical reactor 106 via communication unit 210, and stores received shared data set 160 in storage device 250. Similarly, data collection unit 241 receives shared data set 360 from each of transport robots 300 via communication unit 210, and stores received shared data set 360 in storage device 250.

Model production unit 242 performs multivariable regression analysis using power generation data set 253 for each lot to produce a prediction model 254 for predicting, from a quantity and a product name of the products, a manufacturing period and a consumption amount of formic acid for manufacturing the products of the quantity and the product name. Model production unit 242 stores produced prediction model 254 in storage device 250. As the multivariable regression analysis, a known method can be adopted.

Upon reception of manufacturing instruction of a new lot, prediction unit 243 acquires a quantity and a product name of products corresponding to the lot from manufacturing management device 400, and predicts a manufacturing period and a consumption amount of formic acid by inputting the quantity and the product name that has been acquired to prediction model 254. Prediction unit 243 calculates a demand amount of formic acid in the certain future period based on the predicted manufacturing period and the consumption amount of formic acid, and includes data indicating the calculated demand amount of formic acid in shared data set 260.

In response to the remaining amount of formic acid stored in formic acid tank 204 becoming less than a predetermined second threshold value, supply instruction unit 244 delivers a fuel request to one or more transport robots 300 via communication unit 210. Supply instruction unit 244 repeatedly delivers the fuel request until an acceptance signal is received. A robot ID for identifying transport robot 300 is added to the acceptance signal.

A device ID for identifying manufacturing device 200, position data indicating the latest position measured by position sensor 203, and data indicating a required supply amount of fuel are added to the fuel request. The required supply amount of the fuel is an amount for filling up formic acid tank 204 determined from a capacity of formic acid tank 204 and the remaining amount of formic acid stored in formic acid tank 204.

Supply instruction unit 244 transmits a confirmation signal to transport robot 300 that has transmitted the acceptance signal. When acceptance signals are received from the plurality of transport robots 300, supply instruction unit 244 selects one of the plurality of transport robots 300 and transmits the confirmation signal to the selected one of transport robots 300.

<Configuration of Transport Robot>

Figure 6:
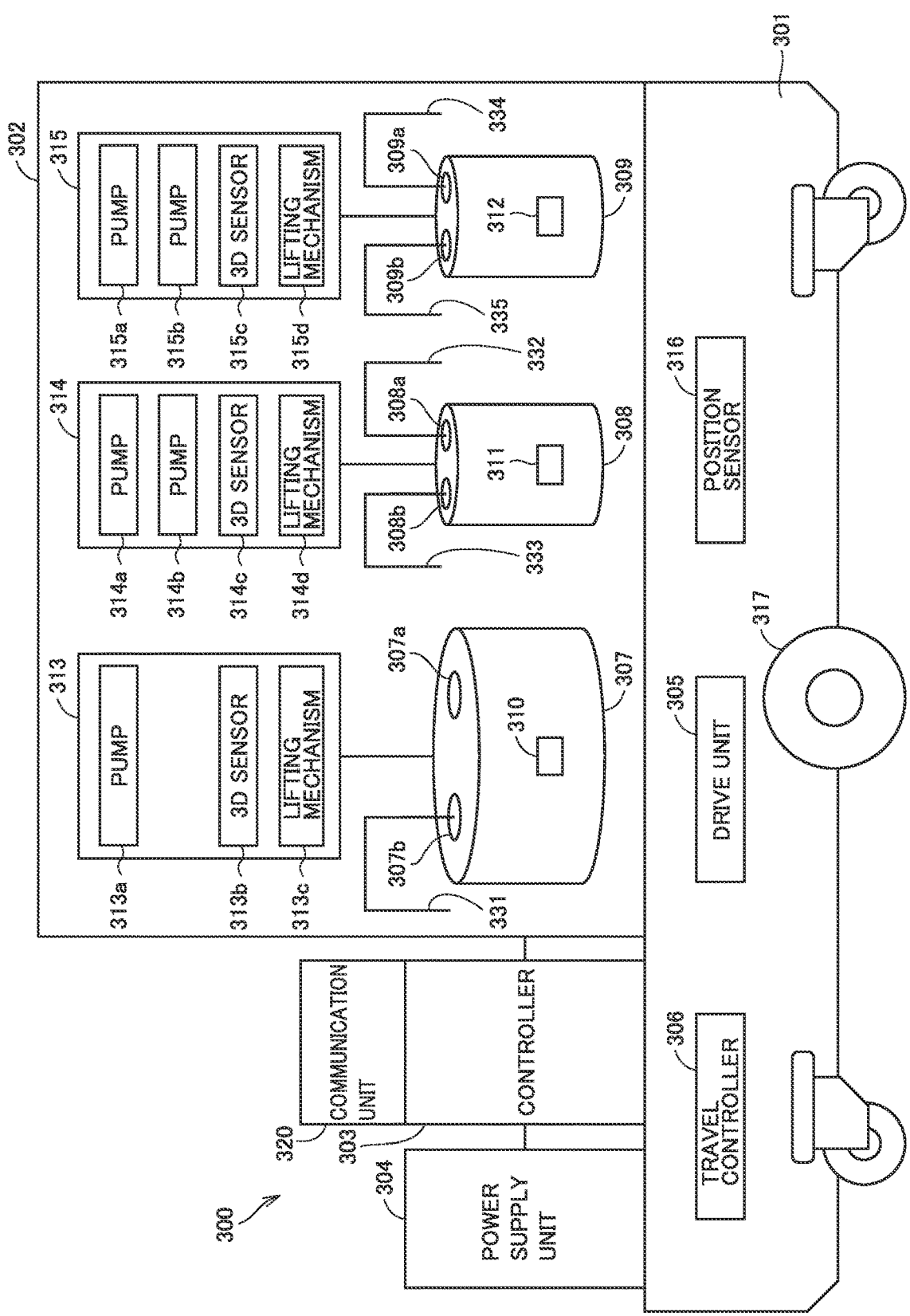
FIG. 6 is a schematic diagram illustrating an example of a configuration of a transport robot illustrated in FIG. 1.

FIG. 6 is a schematic diagram illustrating an example of a configuration of a transport robot illustrated in FIG. 1. As shown in FIG. 6, transport robot 300 includes a mobile robot 301, an upper device 302, a controller 303, a power supply unit 304, and a communication unit 320.

Mobile robot 301 includes a drive unit 305, a travel controller 306, a position sensor 316, and a wheel 317.

Drive unit 305 rotationally drives wheel 317. As a result, mobile robot 301 moves.

Travel controller 306 controls drive unit 305 in accordance with a travel instruction from controller 303.

Position sensor 316 measures a position of transport robot 300 using a known technique. For example, GPS, a beacon positioning method, or the like may be applied. Position sensor 316 outputs position data indicating the measured position to controller 303.

Upper device 302 is mounted on mobile robot 301. Upper device 302 includes a formic acid tank 307, a water tank 308, a $CO_2$ tank 309, and transport units 313-315. Formic acid tank 307 stores formic acid. An inlet 307a and an outlet 307b are provided for formic acid tank 307, and formic acid is input from inlet 307a and discharged from outlet 307b. A pipe 331 is connected to outlet 307b. A level sensor 310 is attached to formic acid tank 307. Level sensor 310 measures an amount of formic acid stored in formic acid tank 307, and outputs the measurement result to controller 303.

Water tank 308 stores water. An inlet 308a and an outlet 308b are provided for water tank 308, and water is input from inlet 308a and discharged from outlet 308b. Pipes 332 and 333 are respectively connected to inlet 308a and outlet 308b. A level sensor 311 is attached to water tank 308. Level sensor 311 measures an amount of water stored in water tank 308, and outputs the measurement result to controller 303.

$CO_2$ tank 309 stores gaseous carbon dioxide ($CO_2$). An inlet 309a and an outlet 309b are provided for $CO_2$ tank 309, and carbon dioxide is input from inlet 309a and discharged from outlet 309b. Pipes 334 and 335 are respectively connected to inlet 309a and outlet 309b. A level sensor 312 is attached to $CO_2$ tank 309. Level sensor 312 measures an amount of carbon dioxide stored in $CO_2$ tank 309 and outputs the measurement result to controller 303.

Transport unit 313 transports formic acid between formic acid tank 307 and an external tank. Transport unit 313 includes a pump 313a, a 3D sensor 313b, and a lifting mechanism 313c.

Pump 313a is provided in pipe 331 connected to outlet 307b. Pump 313a operates in accordance with an instruction from controller 303, and sends formic acid from formic acid tank 307 to the external tank.

3D sensor 313b is installed so as to measure a three-dimensional shape of inlet 307a and outlet 307b of formic acid tank 307 and the periphery thereof. The measurement result of 3D sensor 313b is output to controller 303.

Lifting mechanism 313c moves up and down formic acid tank 307 in accordance with an instruction from controller 303.

Transport unit 314 transports water between water tank 308 and an external tank. Transport unit 314 includes pumps 314a and 314b, a 3D sensor 314c, and a lifting mechanism 314d.

Pump 314a is provided in pipe 332 connected to inlet 308a. Pump 314a operates in accordance with an instruction from controller 303, and sends water from the external tank to water tank 308.

Pump 314b is provided in pipe 333 connected to outlet 308b. Pump 314b operates in accordance with an instruction from controller 303, and sends water from water tank 308 to the external tank.

3D sensor 314c is installed so as to measure a three-dimensional shape of inlet 308a and outlet 308b of water tank 308 and the periphery thereof. The measurement result of 3D sensor 314c is output to controller 303.

Lifting mechanism 314d moves up and down water tank 308 in accordance with an instruction from controller 303.

Transport unit 315 transports carbon dioxide between $CO_2$ tank 309 and an external tank. Transport unit 315 includes pumps 315a and 315b, a 3D sensor 315c, and a lifting mechanism 315d.

Pump 315a is provided in pipe 334 connected to inlet 309a. Pump 315a operates in accordance with an instruction from controller 303, and sends carbon dioxide from the external tank to $CO_2$ tank 309.

Pump 315b is provided in pipe 335 connected to outlet 309b. Pump 315b operates in accordance with an instruction from controller 303, and sends carbon dioxide from $CO_2$ tank 309 to the external tank.

3D sensor 315c is installed so as to measure a three-dimensional shape of inlet 309a and outlet 309b of $CO_2$ tank 309 and the periphery thereof. The measurement result of 3D sensor 315c is output to controller 303.

Lifting mechanism 315d moves up and down $CO_2$ tank 309 in accordance with an instruction from controller 303.

Power supply unit 304 supplies power to each unit of transport robot 300. Power supply unit 304 includes a secondary battery. A home position of transport robot 300 is set at a charging station (not illustrated) included in manufacturing system 1. Therefore, when transport robot 300 returns to the home position, power supply unit 304 is charged.

Communication unit 320 mediates data transmission to and from external devices (including electrochemical reactor 106 and manufacturing device 200). Communication unit 320 performs data transmission using, for example, a wireless local area network (LAN).

Controller 303 is typically a computer having a general-purpose architecture, and executes processing according to the present embodiment by executing a program (instruction codes) installed in advance. Typically, such a program is distributed in a state of being stored in various recording media and the like, or is installed in controller 303 via a network or the like.

When such a general-purpose computer is used, an operating system (OS) for executing basic processing of the computer may be installed in addition to an application for executing the processing according to the present embodiment. In this case, the program according to the present embodiment may call a necessary module, among program modules provided as a part of the OS, in a predetermined array at a predetermined timing to execute processing. That is, the program itself according to the present embodiment does not need to include a module as described above, and the processing may be executed in cooperation with the OS. The program according to the present embodiment may be in a form not including a part of such modules.

Furthermore, the program according to the present embodiment may be provided by being incorporated in a part of another program. Also in this case, the program itself does not include the module included in the other program combined as described above, and the processing is executed in cooperation with the another program. That is, the program according to the present embodiment may be incorporated in such another program. Note that a part or all of the functions provided by execution of the program may be implemented as a dedicated hardware circuit such as an ASIC.

Figure 7:
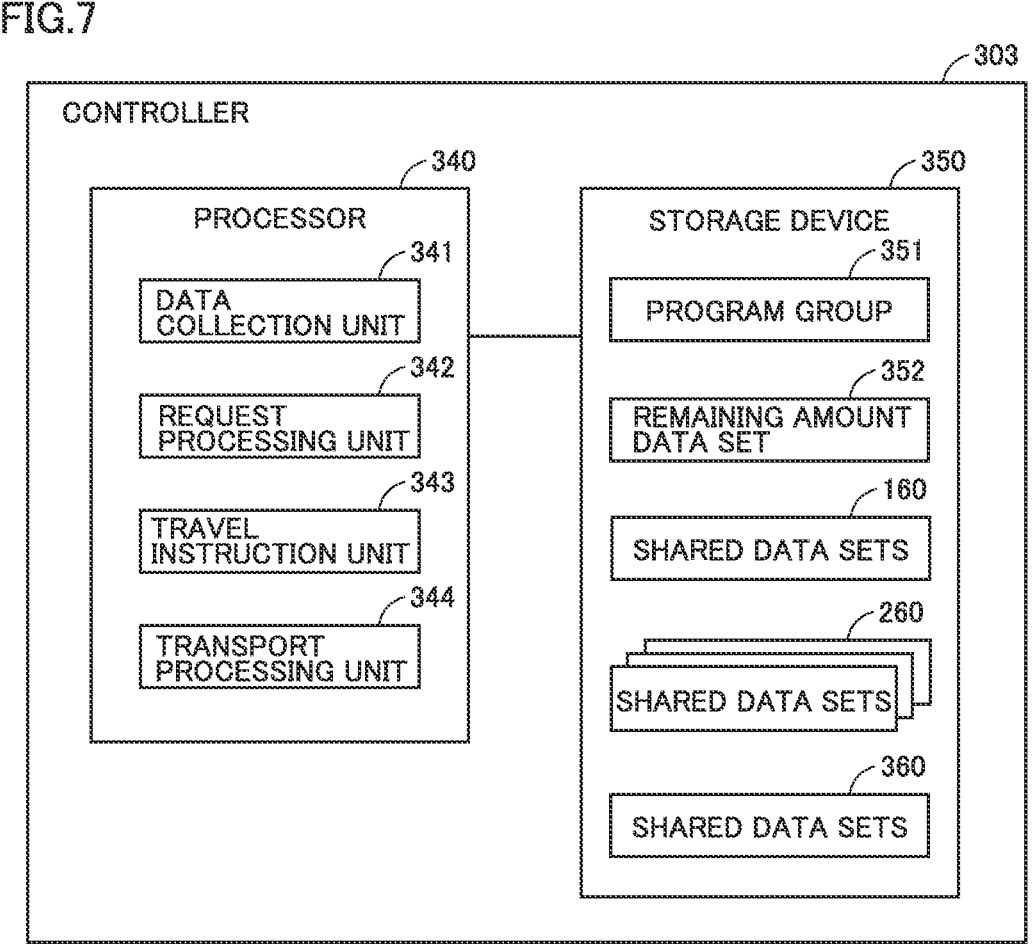
FIG. 7 is a diagram illustrating a configuration of a controller illustrated in FIG. 6.

FIG. 7 is a diagram illustrating a configuration of a controller illustrated in FIG. 6. Controller 303 controls an operation of each unit of transport robot 300. As illustrated in FIG. 7, controller 303 includes a processor 340 such as a CPU or an MPU and a storage device 350.

Storage device 350 includes, for example, a hard disk, a RAM, a ROM, a semiconductor storage device, or the like, and stores a program group 351 and various data related to execution of program group 351.

Processor 340 executes program group 351 stored in storage device 350. Functional blocks realized by processor 340 executing program group 351 include a data collection unit 341, a request processing unit 342, a travel instruction unit 343, and a transport processing unit 344.

Data collection unit 341 periodically collects the measurement results of level sensors 310, 311, and 312 and produces a remaining amount data set 352 indicating the latest measurement result. Data collection unit 341 stores produced remaining amount data set 352 in storage device 350.

Furthermore, data collection unit 341 produces a shared data set 360 to be shared with electrochemical reactor 106 and manufacturing device 200, and stores produced shared data set 360 in storage device 350. Data collection unit 341 periodically updates shared data set 360. Data collection unit 341 transmits updated shared data set 360 to electrochemical reactor 106 and manufacturing device 200 via communication unit 320 at timing when shared data set 360 is updated. Shared data set 360 includes, for example, data indicating the latest measurement results of level sensors 310, 311, and 312 and data indicating the position measured by position sensor 316.

Data collection unit 341 receives shared data set 160 from electrochemical reactor 106 via communication unit 320, and stores received shared data set 160 in storage device 350. Similarly, data collection unit 341 receives shared data set 260 from each of manufacturing devices 200 via communication unit 320, and stores received shared data set 260 in storage device 350.

Request processing unit 342 receives a fuel request delivered from manufacturing device 200. Upon reception of the fuel request, request processing unit 342 determines whether or not the acceptance signal has been issued from another transport robot 300. In response to the fact that another transport robot 300 does not issue the acceptance signal, request processing unit 342 transmits an acceptance signal to which a robot ID for identifying transport robot 300 is added.

Upon reception of the confirmation signal for the acceptance signal, request processing unit 342 transmits a supply request to electrochemical reactor 106. Request processing unit 342 adds a robot ID for identifying transport robot 300 and data indicating a required amount of formic acid to the supply request. The required amount of formic acid is an amount for filling up formic acid tank 307, and is calculated from an amount of formic acid stored in formic acid tank 307 and a capacity of formic acid tank 307.

Request processing unit 342 receives either a standby signal or a permission signal as a response to the supply request. When the standby signal is received, request processing unit 342 waits for a certain period of time, and then transmits the supply request again to electrochemical reactor 106. When the permission signal is received, request processing unit 342 outputs a first movement instruction to travel instruction unit 343.

Upon reception of the first movement instruction, travel instruction unit 343 determines a first movement route from a current position measured by position sensor 316 to a target place, and outputs a travel instruction to travel along the first movement route to travel controller 306. The target place of the first movement route is a position where formic acid can be supplied from pipe 132 (see FIG. 2) of fuel production system 100, and is determined in advance. As a result, mobile robot 301 moves to the target place on the first movement route.

Transport processing unit 344 executes processing related to the transport of formic acid from fuel production system 100 to formic acid tank 307 in response to the current position measured by position sensor 316 reaching the target place of the first movement path. Specifically, transport processing unit 344 detects the position and orientation of inlet 307a and pipe 132 from the measurement result of 3D sensor 313b, and determines whether or not a relative positional relationship between inlet 307a and pipe 132 is in a predetermined state. The predetermined state is a state in which a lower end of pipe 132 is positioned above inlet 307a. When it is determined that the relative positional relationship between inlet 307a and pipe 132 is not in the predetermined state, transport processing unit 344 calculates a movement amount of inlet 307a for bringing the relative positional relationship between inlet 307a and pipe 132 into the predetermined state. Transport processing unit 344 produces a position adjustment instruction for making movement by the calculated movement amount, and outputs the produced position adjustment instruction to travel controller 306. As a result, mobile robot 301 moves by the calculated movement amount. As a result, the relative positional relationship between inlet 307a and pipe 132 is set into the predetermined state.

When it is determined that the relative positional relationship between inlet 307a and pipe 132 is in the predetermined state, transport processing unit 344 raises lifting mechanism 313c by a predetermined amount. As a result, the lower end of pipe 132 is inserted into formic acid tank 307 through inlet 307a.

When the lifting of the lifting mechanism 313c is completed, transport processing unit 344 transmits a supply start instruction to electrochemical reactor 106 via communication unit 320. As a result, formic acid is supplied from pipe 132 and stored in formic acid tank 307.

Upon reception of a signal indicating completion of supply from electrochemical reactor 106, transport processing unit 344 lowers lifting mechanism 313c. When lifting mechanism 313c descends, transport processing unit 344 outputs a second movement instruction to travel instruction unit 343.

Upon reception of the second movement instruction, travel instruction unit 343 determines a second movement route to a position of manufacturing device 200 indicated by the position data added to the fuel request, and outputs a travel instruction along the second movement route to travel controller 306. As a result, mobile robot 301 starts moving to the target place on the second movement route. The target place of the second movement route is the position of formic acid tank 204 of manufacturing device 200.

Transport processing unit 344 executes a process relating to transport of formic acid from formic acid tank 307 to formic acid tank 204 of manufacturing device 200 in response to the current position measured by position sensor 316 reaching the target place of the second movement path. Specifically, transport processing unit 344 extracts a pixel in which pipe 331 connected to outlet 307b and inlet 204a of formic acid tank 204 are shown from the measurement result of 3D sensor 313b, and determines whether or not a relative positional relationship between pipe 331 and inlet 204a is in a predetermined state. The predetermined state is a state in which a lower end of pipe 331 is positioned above inlet 204a. When it is determined that the relative positional relationship between pipe 331 and inlet 204a is not in the predetermined state, transport processing unit 344 calculates a movement amount of transport robot 300 for bringing the relative positional relationship between pipe 331 and inlet 204a into the predetermined state. Transport processing unit 344 produces a position adjustment instruction for making movement by the calculated movement amount, and outputs the produced position adjustment instruction to travel controller 306. As a result, mobile robot 301 moves by the calculated movement amount. As a result, the relative positional relationship between pipe 331 and inlet 204a is set into the predetermined state.

When it is determined that the relative positional relationship between pipe 331 connected to outlet 307b and inlet 204a is in the predetermined state, transport processing unit 344 lowers lifting mechanism 313c by a predetermined amount. As a result, the lower end of pipe 331 is inserted into formic acid tank 204 through inlet 204a.

When the lowering of lifting mechanism 313c is completed, transport processing unit 344 starts an operation of pump 313a. As a result, formic acid is transported from formic acid tank 307 to formic acid tank 204. When the transportation of the required supply amount of formic acid indicated by the data added to the fuel request is completed, transport processing unit 344 stops the operation of pump 313a and raises lifting mechanism 313c.

When lifting of lifting mechanism 313c is completed, transport processing unit 344 outputs a third movement instruction to travel instruction unit 343.

Upon reception of the third movement instruction, travel instruction unit 343 determines a third movement route to the home position, and outputs a travel instruction along the third movement route to travel controller 306. As a result, mobile robot 301 moves to the home position.

It is preferable that water tank 308 is arranged in transport robot 300 such that a tip of pipe 333 connected to outlet 308b of water tank 308 is positioned above inlet 102a of water tank 102 of fuel production system 100 when transport robot 300 reaches the target place of the first movement route. In this case, transport processing unit 344 may perform a process relating to transportation of water from water tank 308 to water tank 102 in response to the arrival of transport robot 300 at the target place of the first movement route. That is, transport processing unit 344 carries out transportation of water from water tank 308 to water tank 102 using pump 314b, 3D sensor 314c, and lifting mechanism 314d included in transport unit 314. A method for carrying out transportation of water from water tank 308 to water tank 102 is similar to the method for carrying out transportation of formic acid from formic acid tank 307 to formic acid tank 204, and thus a detailed description thereof will be omitted.

Similarly, it is preferable that $CO_2$ tank 309 is arranged in transport robot 300 such that a tip of pipe 335 connected to outlet 309b of $CO_2$ tank 309 is positioned above inlet 103a of $CO_2$ tank 103 of fuel production system 100 when transport robot 300 reaches the target place of the first movement route. In this case, transport processing unit 344 may perform a process relating to transportation of carbon dioxide from $CO_2$ tank 309 to $CO_2$ tank 103 in response to the arrival of transport robot 300 at the target place of the first movement route. That is, transport processing unit 344 carries out transportation of carbon dioxide from $CO_2$ tank 309 to $CO_2$ tank 103 using pump 315b, 3D sensor 315c, and lifting mechanism 315d included in transport unit 315. A method for carrying out transportation of carbon dioxide from $CO_2$ tank 309 to $CO_2$ tank 103 is similar to the method for carrying out transportation of formic acid from formic acid tank 307 to formic acid tank 204, and thus a detailed description thereof will be omitted.

In addition, it is preferable that water tank 205 is arranged in manufacturing device 200 such that a tip of pipe 332 connected to inlet 308a of water tank 308 is positioned above outlet 205b of water tank 205 of manufacturing device 200 when transport robot 300 reaches the target place of the second movement route. In this case, transport processing unit 344 may perform a process relating to transportation (recovery) of water from water tank 205 to water tank 308 in response to the arrival of transport robot 300 at the target place of the second movement route. That is, transport processing unit 344 carries out transportation of water from water tank 205 to water tank 308 using pump 314a, 3D sensor 314c, and lifting mechanism 314d included in transport unit 314. A method for carrying out transportation of water from water tank 205 to water tank 308 is similar to the method for carrying out transportation of water from water tank 308 to water tank 102, and thus a detailed description thereof will be omitted.

Similarly, it is preferable that $CO_2$ tank 206 is arranged in manufacturing device 200 such that a tip of pipe 334 connected to inlet 309a of $CO_2$ tank 309 is positioned above outlet 206b of $CO_2$ tank 206 of manufacturing device 200 when transport robot 300 reaches the target place of the second movement route. In this case, transport processing unit 344 may perform a process relating to transportation (recovery) of carbon dioxide from $CO_2$ tank 206 to $CO_2$ tank 309 in response to the arrival of transport robot 300 at the target place of the second movement route. That is, transport processing unit 344 carries out transportation of carbon dioxide from $CO_2$ tank 206 to $CO_2$ tank 309 using pump 315a, 3D sensor 315c, and lifting mechanism 315d included in transport unit 315. A method for carrying out transportation of carbon dioxide from $CO_2$ tank 206 to $CO_2$ tank 309 is similar to the method for carrying out transportation of carbon dioxide from $CO_2$ tank 309 to $CO_2$ tank 206, and thus a detailed description thereof will be omitted.

<Flow of Processing of Manufacturing System>

With reference to FIGS. 8 to 12, a flow of processing of manufacturing system 1 will be described.

(Process of Determining Supply Source of Generation Fuel)

Figure 8:
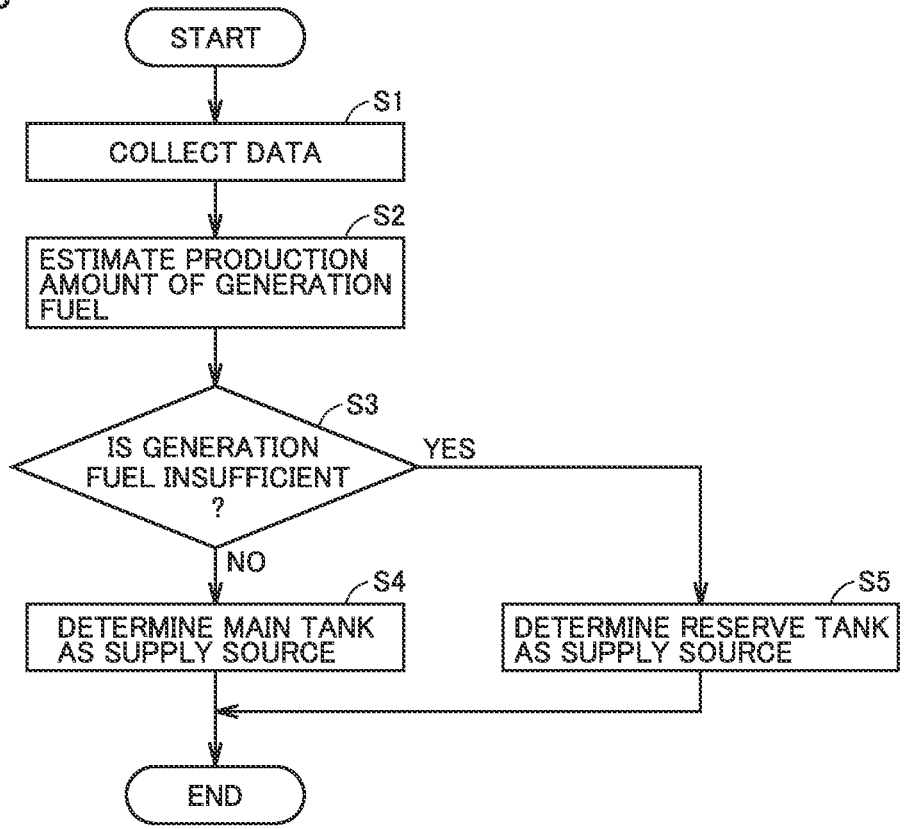
FIG. 8 is a flowchart showing an example of a flow of a process of determining a supply source of generation fuel in the fuel production system.

FIG. 8 is a flowchart showing an example of a flow of a process of determining a supply source of generation fuel in the fuel production system. Steps S1 to S5 shown in FIG. 8 are periodically executed.

First, controller 108 collects various data (step S1). The data collected includes remaining amount data set 152, shared data sets 160, 260, and 360, and artificial photosynthesis data set 153.

Next, controller 108 predicts a production amount of formic acid in a certain future period by using the collected data (step S2). Specifically, controller 108 performs multivariable regression analysis using artificial photosynthesis data set 153 to produce prediction model 154 for predicting, from environmental parameters, a production amount of formic acid per unit time. Controller 108 predicts a production amount of formic acid in a future certain period by inputting the latest measurement result of environmental sensor 105 to prediction model 154.

Next, controller 108 determines whether or not the generation fuel (formic acid in this case) in main tank 101 is insufficient (step S3). For example, controller 108 determines that the generation fuel is insufficient when an amount (difference) obtained by subtracting the demand amount of formic acid in the certain future period from a sum of the production amount of formic acid in the certain future period and the amount of formic acid stored in main tank 101 is equal to or less than the first threshold value.

If NO in step S3, controller 108 determines main tank 101 as the supply source of formic acid, and switches three-way valve 133 to the first state (step S4). As a result, formic acid is supplied outside from main tank 101.

If YES in step S3, controller 108 determines reserve tank 121 as the supply source of formic acid, and switches three-way valve 133 to the second state (step S5). As a result, formic acid is supplied outside from reserve tank 121. After steps S4 and S5, controller 108 ends the process of determining the supply source of the generation fuel.

(Process of Predicting Demand Amount of Generation Fuel in Manufacturing Device)

Figure 9:
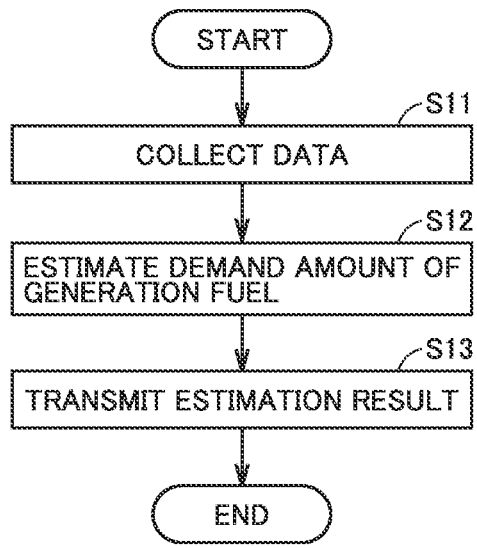
FIG. 9 is a flowchart showing an example of a flow of a process of predicting a demand amount of the generation fuel in the manufacturing device.

FIG. 9 is a flowchart showing an example of a flow of a process of predicting a demand amount of the generation fuel in the manufacturing device. Steps S11 to S13 shown in FIG. 9 are periodically executed.

First, controller 209 collects various data (step S11). The data collected includes remaining amount data set 252, shared data sets 160 and 360, and power generation data set 253.

Next, controller 209 estimates a demand amount of formic acid in a certain future period by using the collected data (step S12). Specifically, controller 209 performs multivariable regression analysis using power generation data set 253 to produce prediction model 254 for predicting, from a quantity and a product name of the products, a manufacturing period and a consumption amount of formic acid. Controller 209 predicts a manufacturing period and a consumption amount of formic acid by inputting a quantity and a product name of products to prediction model 254. Controller 209 estimates a demand amount of formic acid in the certain future period based on the manufacturing period and the consumption amount of formic acid that have been predicted.

Next, controller 209 produces shared data set 260 including data indicating the demand amount of formic acid in the certain future period, and transmits produced shared data set 260 to electrochemical reactor 106 (step S13). After step S13, controller 209 ends the prediction process of the demand amount of the generation fuel.

(Process of Supply Instruction of Generation Fuel in Manufacturing Device)

Figure 10:
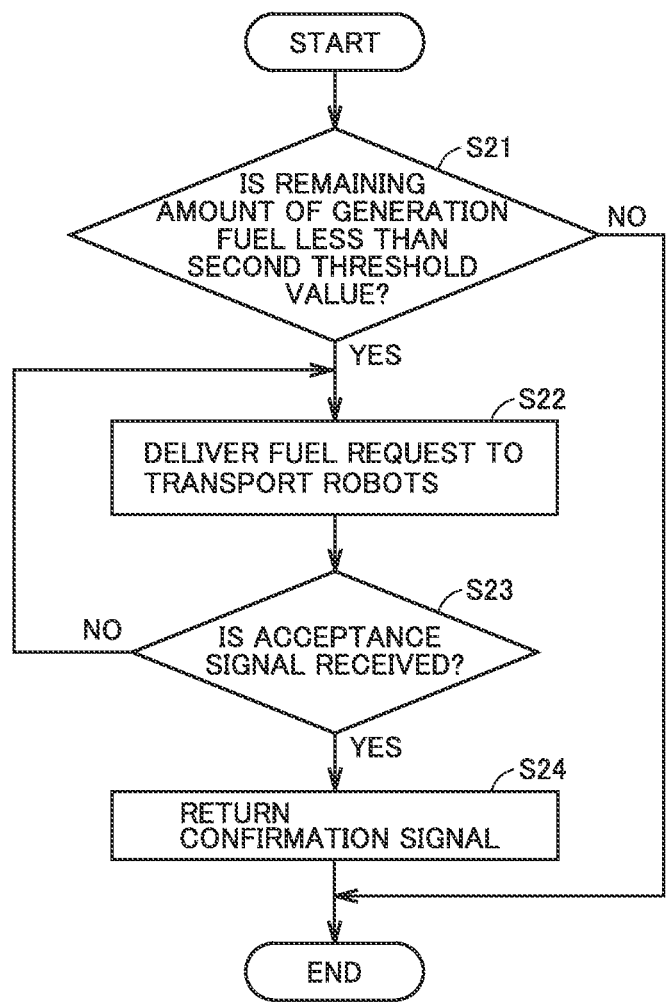
FIG. 10 is a flowchart showing an example of a flow of a process of supply instruction of the generation fuel in the manufacturing device.

FIG. 10 is a flowchart showing an example of a flow of a process of supply instruction of the generation fuel in the manufacturing device. Steps S21 to S24 shown in FIG. 10 are periodically executed.

First, controller 209 determines whether or not the remaining amount of the generation fuel is less than the second threshold value (step S21). Specifically, controller 209 determines whether or not the amount of formic acid indicated by the latest measurement result by level sensor 211 is less than the second threshold value.

If YES in step S21, controller 209 delivers a fuel request to one or more transport robots 300 (step S22).

Next, controller 209 determines whether or not an acceptance signal has been received from any of one or more transport robots 300 (step S23). If NO in step S23, controller 209 returns the process to step S22.

If YES in step S23, controller 209 transmits a confirmation signal to transport robot 300 that is a transmission source of the acceptance signal (step S24). After step S24, or if NO in step S21, controller 209 ends the supply instruction process of the generation fuel.

(Process of Transporting Generation Fuel by Transport Robot)

Figure 11:
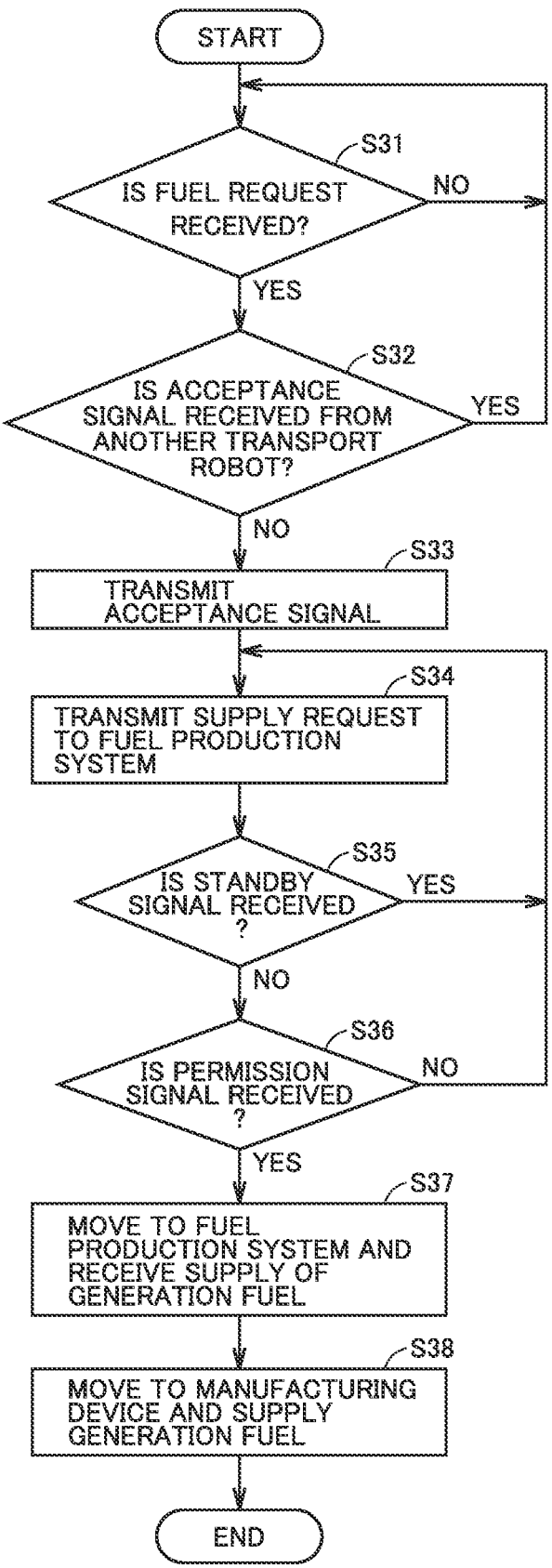
FIG. 11 is a flowchart showing an example of a flow of a process of transporting the generation fuel by the transport robot.

FIG. 11 is a flowchart showing an example of a flow of a process of transporting the generation fuel by the transport robot.

First, controller 303 determines whether or not a fuel request has been received (step S31). If NO in step S31, controller 303 returns the process to step S31.

If YES in step S31, controller 303 determines whether or not an acceptance signal has been received from another transport robot 300 (step S32). If YES in step S32, controller 303 returns the process to step S31.

If NO in step S31, controller 303 transmits the acceptance signal and receives a confirmation signal from manufacturing device 200 (step S33).

Next, controller 303 transmits a supply request to electrochemical reactor 106 of fuel production system 100 (step S34).

Next, controller 303 determines whether or not a standby signal has been received from electrochemical reactor 106 (step S35). If YES in step S35, controller 303 waits for a predetermined time, and then returns the process to step S34.

If NO in step S35, controller 303 determines whether or not a permission signal has been received from electrochemical reactor 106 (step S36). If NO in step S36, controller 303 waits for a predetermined time, and then returns the process to step S34.

If YES in step S36, step S37 is executed. In step S37, controller 303 produces a travel instruction for making movement to fuel production system 100, and outputs the produced travel instruction to mobile robot 301. As a result, transport robot 300 moves to fuel production system 100. After moving to fuel production system 100, controller 303 sends a supply start instruction to electrochemical reactor 106. As a result, formic acid tank 307 of transport robot 300 receives supply of the generation fuel (formic acid) from fuel production system 100.

Next, step S38 is executed. In step S38, controller 303 produces a travel instruction for making movement to manufacturing device 200, and outputs the produced travel instruction to mobile robot 301. As a result, transport robot 300 moves to manufacturing device 200. After moving to manufacturing device 200, controller 303 controls transport unit 313 to transport formic acid from formic acid tank 307 to formic acid tank 204 of manufacturing device 200.

After step S38, transport robot 300 moves to the home position, and ends the process of transporting the generation fuel.

(Process of Supplying Generation Fuel in Fuel Production System)

Figure 12:
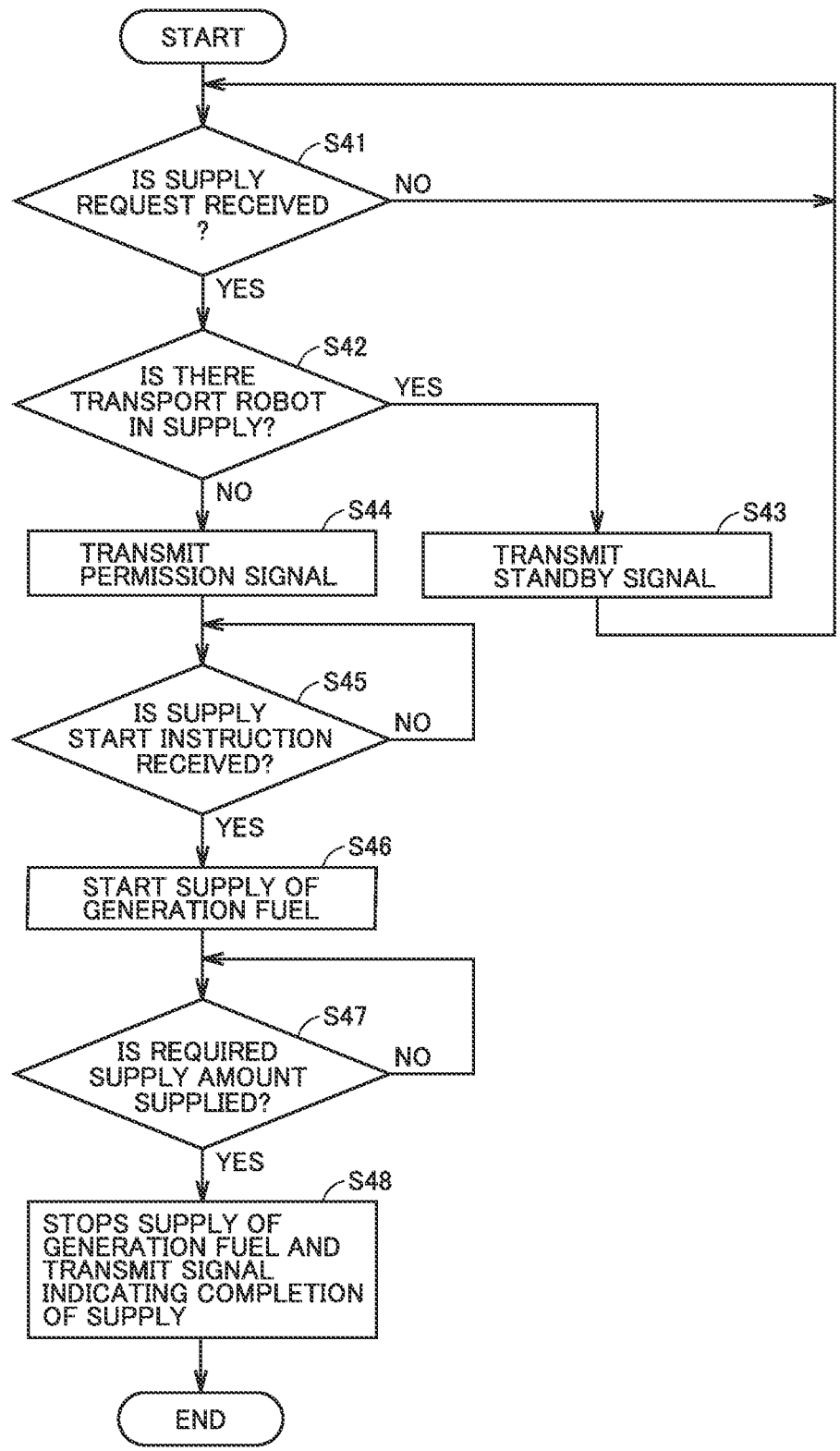
FIG. 12 is a flowchart showing an example of a flow of a process of supplying the generation fuel in the fuel production system.

FIG. 12 is a flowchart showing an example of a flow of a process of supplying the generation fuel in the fuel production system.

First, controller 108 determines whether or not a supply request has been received from transport robot 300 (step S41). If NO in step S41, controller 108 returns the process to step S41.

If YES in step S41, controller 108 determines whether or not there is another transport robot 300 in supply (step S42). Specifically, controller 108 determines that there is another transport robot 300 in supply when flag 155 is "0".

If YES in step S42, controller 108 transmits a standby signal to transport robot 300 (step S43), and returns the process to step S41.

If NO in step S42, controller 108 transmits a permission signal to transport robot 300 (step S44). Next, controller 108 determines whether or not a supply start instruction has been received from transport robot 300 (step S45). If NO in step S45, controller 108 returns the process to step S45.

If YES in step S45, controller 108 opens solenoid valve 134 and drives the pump provided in pipe 130 or pipe 131 to start supply of the generation fuel (formic acid) (step S46).

Next, controller 108 determines whether or not a required supply amount of formic acid has been supplied (step S47). If NO in step S47, controller 108 returns the process to step S47.

If YES in step S47, step S48 is executed. In step S48, controller 108 closes solenoid valve 134, stops the operation of the pump provided in pipe 130 or pipe 131, and stops supply of the generation fuel. Further, controller 108 transmits a signal indicating completion of supply to transport robot 300. After step S48, controller 303 ends the process of supplying the generation fuel.

Modified Example

Figure 13:
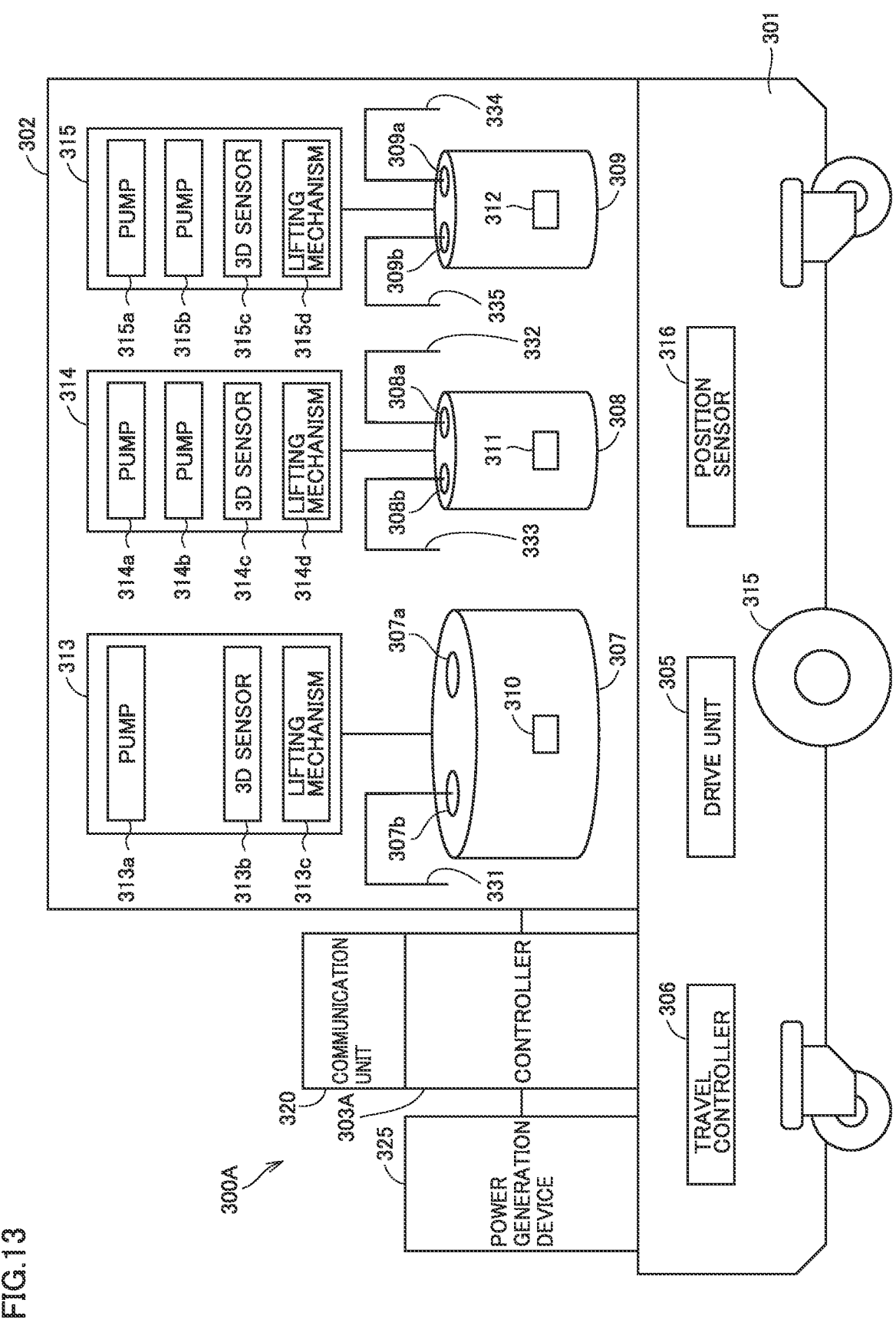
FIG. 13 is a diagram illustrating a configuration of the transport robot according to a modified example.

FIG. 13 is a diagram illustrating a configuration of the transport robot according to a modified example. As illustrated in FIG. 13, a transport robot 300A according to the modified example is different from transport robot 300 illustrated in FIG. 6 in that a power generation device 325 is provided instead of power supply unit 304 and a controller 303A is provided instead of controller 303.

Power generation device 325 generates power using formic acid supplied from formic acid tank 307 as a generation fuel using a known technique, and supplies the power to each unit of transport robot 300A. Power generation using formic acid produces water and carbon dioxide. Power generation device 325 discharges water and carbon dioxide that have been produced to water tank 308 and $CO_2$ tank 309, respectively.

Controller 303A has the following functions in addition to the functions of controller 303 described above. That is, controller 303A transmits a supply request to electrochemical reactor 106 in response to the amount of formic acid stored in formic acid tank 307 being less than a predetermined third threshold value. As a result, formic acid is supplied to formic acid tank 307.

In the above description, controller 108 is included in electrochemical reactor 106. However, some or all of the functions implemented by controller 108 may be implemented by a device external to electrochemical reactor 106.

In the above description, the demand amount of formic acid predicted by prediction unit 243 is used to determine whether the supply source of formic acid is switched to main tank 101 or reserve tank 121. However, the demand amount of formic acid predicted by prediction unit 243 may be used for other purposes. For example, the timing of transportation of formic acid by transport robot 300 may be determined on the basis of the demand amount of formic acid predicted by prediction unit 243. Specifically, supply instruction unit 244 may deliver a fuel request in response to an amount obtained by subtracting a predicted demand amount of formic acid from the remaining amount of formic acid stored in formic acid tank 204 being less than a predetermined threshold value.

In the above description, determination unit 144 determines one of main tank 101 and reserve tank 121 as the target tank for supplying formic acid to transport robot 300 based on the amount of formic acid stored in main tank 101 and the demand amount and the production amount of formic acid in the certain future period. However, determination unit 144 may determine one of main tank 101 and reserve tank 121 as the target tank for supplying formic acid to transport robot 300 based on the amount of formic acid stored in main tank 101 and the production amount of formic acid produced in the certain future period. Specifically, determination unit 144 may determine main tank 101 as the supply source of formic acid in response to a total amount of the amount of formic acid stored in main tank 101 and the production amount of formic acid in the certain future period being equal to or more than a predetermined threshold value, and determine reserve tank 121 as the supply source of formic acid in response to the total amount being less than the threshold value.

§ 3 Supplementary Note

As described above, the present embodiment includes the following disclosure.

(Configuration 1)

A manufacturing system (1) including:
a first tank (101, 121) configured to store generation fuel;
a manufacturing device (200) having a first power generation device (207) configured to generate power using the generation fuel, the manufacturing device (200) being configured to operate using power supplied from the first power generation device (207); and
a transport robot (300) configured to transport the generation fuel from the first tank (101, 121) to the manufacturing device (200).

(Configuration 2)

The manufacturing system (1) according to configuration 1, in which
the manufacturing device (200) includes
a second tank (204) configured to store the generation fuel, and
a communication unit (210) configured to transmit a first request to the transport robot (300) in response to a remaining amount of the second tank (204) being smaller than a threshold value,
the transport robot (300) includes
a mobile robot (301),
a third tank (307) configured to store the generation fuel, and
a controller (303) configured to control the mobile robot (301), and
the controller (303)
controls the mobile robot (301) to move to the first tank (101, 121) in response to reception of the first request, and
controls the mobile robot (301) to move to the manufacturing device (200) in response to completion of transportation of the generation fuel from the first tank (101, 121) to the third tank (307).

(Configuration 3)

The manufacturing system (1) according to configuration 2, in which
the transport robot (300) includes a second power generation device (325) configured to generate power using the generation fuel stored in the third tank (307), and
the mobile robot (301) operates using power supplied from the second power generation device (325).

(Configuration 4)

The manufacturing system (1) according to any one of configurations 1 to 3, further including a first prediction unit (240, 243) configured to predict a demand amount of the generation fuel of the manufacturing device in a certain future period based on a planned quantity of products to be manufactured by the manufacturing device (200) and a product type of the products.

(Configuration 5)

The manufacturing system (1) according to any one of configurations 1 to 4, further including
a fuel production system (100) configured to produce the generation fuel, in which
the first tank (101, 121) includes
a main tank (101) configured to store the generation fuel produced by the fuel production system, and
a reserve tank (121) configured to store generation fuel supplied from outside of the fuel production system, and
the fuel production system (100) determines one of the main tank (101) and the reserve tank (121) as a target tank depending on an environment in which the generation fuel is produced, and supplies the generation fuel from the target tank to the transport robot (300).

(Configuration 6)

The manufacturing system (1) according to configuration 5, in which
the fuel production system (100) includes
a second prediction unit (140, 143) configured to predict a production amount of the generation fuel to be produced in a certain future period based on the environment, and
a determination unit (140, 144) configured to determine the target tank based on the production amount, and a storage amount of the generation fuel in the main tank (101).

(Configuration 7)

The manufacturing system according to configuration 4, further including
a fuel production system (100) configured to produce the generation fuel, in which
the first tank (101, 121) includes
a main tank (101) configured to store the generation fuel produced by the fuel production system, and
a reserve tank (121) configured to store generation fuel supplied from outside of the fuel production system,
the fuel production system (100) includes
a second prediction unit (140, 143) configured to predict a production amount of the generation fuel to be produced in a certain future period based on an environment in which the generation fuel is produced, and
a determination unit (140, 144) configured to determine one of the main tank (101) and the reserve tank (121) as a target tank based on the demand amount, the production amount, and a storage amount of the generation fuel in the main tank (101), and
the target tank supplies the generation fuel to the transport robot (300).

(Configuration 8)

The manufacturing system (1) according to any one of configurations 5 to 7, in which the fuel production system (100) produces, as the generation fuel, formic acid by artificial photosynthesis.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A manufacturing system comprising:
   a first tank configured to store generation fuel;
   a manufacturing device constituting a production line in a factory, the manufacturing device including i) a wagon, ii) a first power generation device disposed on the wagon, the first power generation device being configured to generate power using the generation fuel, and iii) a manufacturing robot disposed on the wagon, the manufacturing robot being configured to manufacture industrial products using power supplied from the first power generation device;
   a transport robot configured to transport the generation fuel from the first tank to the manufacturing device; and
   a fuel production system configured to produce the generation fuel,
   wherein the first tank includes
      a main tank configured to store the generation fuel produced by the fuel production system, and
      a reserve tank configured to store generation fuel supplied from outside of the fuel production system, and
   wherein the fuel production system is configured to:
      predict a production amount of the generation fuel to be produced in a certain future period based on an environment in which the generation fuel is produced;
      calculate a total amount of a storage amount of the generation fuel in the main tank and the production amount;
      in response to the total amount being more than a threshold value, supply the generation fuel from the main tank to the transport robot; and
      in response to the total amount being less than the threshold value, supply the generation fuel from the reserve tank to the transport robot.

2. The manufacturing system according to claim 1, wherein:
   the manufacturing device includes:
      a second tank configured to store the generation fuel, and
      a communication unit configured to transmit a first request to the transport robot in response to a remaining amount of the second tank being smaller than a threshold value,
   the transport robot includes:
      a mobile robot,
      a third tank configured to store the generation fuel, and
      a controller configured to control the mobile robot, and
   the controller:
      controls the mobile robot to move to the first tank in response to reception of the first request, and
      controls the mobile robot to move to the manufacturing device in response to completion of transportation of the generation fuel from the first tank to the third tank.

3. The manufacturing system according to claim 2, wherein:
   the transport robot includes a second power generation device configured to generate power using the generation fuel stored in the third tank, and
   the mobile robot operates using power supplied from the second power generation device.

4. A manufacturing system comprising:
   a first tank configured to store generation fuel;
   a manufacturing device constituting a production line in a factory, the manufacturing device including i) a wagon, ii) a first power generation device disposed on the wagon, the first power generation device being configured to generate power using the generation fuel, and iii) a manufacturing robot disposed on the wagon, the manufacturing robot being configured to manufacture industrial products using power supplied from the first power generation device;
   a transport robot configured to transport the generation fuel from the first tank to the manufacturing device;
   a first prediction unit configured to predict a demand amount of the generation fuel of the manufacturing device in a certain future period based on a planned quantity of the industrial products to be manufactured by the manufacturing robot and a product type of the industrial products; and
   a fuel production system configured to produce the generation fuel,
   wherein:
   the first tank includes:
      a main tank configured to store the generation fuel produced by the fuel production system, and
      a reserve tank configured to store generation fuel supplied from outside of the fuel production system, and
   the fuel production system is configured to:
      predict a production amount of the generation fuel to be produced in the certain future period based on an environment in which the generation fuel is produced;
      calculate a difference obtained by subtracting the demand amount from a sum of the production amount and a storage amount of the generation fuel in the main tank;
      in response to the difference being more than a threshold value, supply the generation fuel from the main tank to the transport robot; and
      in response to the difference being less than the threshold value, supply the generation fuel from the reserve tank to the transport robot.

5. The manufacturing system according to claim 1, wherein the fuel production system produces, as the generation fuel, formic acid by artificial photosynthesis.

6. The manufacturing system according to claim 4, wherein the fuel production system produces, as the generation fuel, formic acid by artificial photosynthesis.

7. The manufacturing system according to claim 1, wherein the manufacturing device comprises manufacturing equipment for manufacturing a product.

8. The manufacturing system according to claim 7, wherein the generation fuel comprises formic acid.

9. The manufacturing system according to claim 1, wherein the generation fuel comprises formic acid.

10. The manufacturing system according to claim 1, wherein:
the manufacturing device further comprises a position sensor that measures a first position of the manufacturing device,
wherein the first tank is provided at a storage position within the manufacturing system, and
wherein the transport robot transports the generation fuel from the first tank from the storage position to the first position.

11. The manufacturing system according to claim 10, wherein, when the first position of the manufacturing device changes to a second position that is different from the first position, the transport robot transports the generation fuel from the first tank from the storage position to the second position.

12. The manufacturing system according to claim 10, wherein the manufacturing device is powered only from the power generated using the generation fuel and not from power generated by electric wiring.

* * * * *